(12) United States Patent
Boardman et al.

(10) Patent No.: US 7,708,964 B2
(45) Date of Patent: *May 4, 2010

(54) OIL SHALE DERIVED POLLUTANT CONTROL MATERIALS AND METHODS AND APPARATUSES FOR PRODUCING AND UTILIZING THE SAME

(75) Inventors: Richard D. Boardman, Idaho Falls, ID (US); Robert A. Carrington, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 531 days.

This patent is subject to a terminal disclaimer.

(21) Appl. No.: 11/460,547

(22) Filed: Jul. 27, 2006

(65) Prior Publication Data

US 2006/0280666 A1  Dec. 14, 2006
US 2008/0193351 A9  Aug. 14, 2008

Related U.S. Application Data

(63) Continuation-in-part of application No. 11/004,698, filed on Dec. 2, 2004, now Pat. No. 7,384,615.

(51) Int. Cl.
| | |
|---|---|
| *B01D 53/38* | (2006.01) |
| *B01D 53/56* | (2006.01) |
| *B01D 53/48* | (2006.01) |
| *B01D 53/68* | (2006.01) |
| *B01D 53/74* | (2006.01) |
| *B01J 20/30* | (2006.01) |
| *F23B 99/00* | (2006.01) |
| *F23C 99/00* | (2006.01) |

(52) U.S. Cl. ............ 423/210; 423/235; 423/239.1; 423/244.01; 423/244.07; 423/240 R; 423/240 S; 422/168; 422/177; 431/8; 110/218; 110/342; 110/203; 110/233; 110/263; 110/344; 110/345; 502/400; 502/514

(58) Field of Classification Search ........... 423/210, 423/235, 239.1, 244.01, 244.07, 240 R, 240 S; 422/168, 177; 431/8; 110/218, 342, 203, 110/233, 263, 344, 345; 502/400, 514
See application file for complete search history.

(56) References Cited

U.S. PATENT DOCUMENTS

| | | | |
|---|---|---|---|
| 3,837,820 | A | 9/1974 | Kukin |
| 3,900,554 | A | 8/1975 | Lyon |
| 3,995,006 | A | 11/1976 | Downs et al. |
| 4,151,068 | A | 4/1979 | McCollum et al. |

(Continued)

OTHER PUBLICATIONS

Written Opinion of the International Searching Authority for PCT/US07/66709, dated Dec. 6, 2007, 8 pages.

(Continued)

*Primary Examiner*—Timothy C Vanoy
(74) *Attorney, Agent, or Firm*—TraskBritt

(57) ABSTRACT

Pollution control substances may be formed from the combustion of oil shale, which may produce a kerogen-based pyrolysis gas and shale sorbent, each of which may be used to reduce, absorb, or adsorb pollutants in pollution producing combustion processes, pyrolysis processes, or other reaction processes. Pyrolysis gases produced during the combustion or gasification of oil shale may also be used as a combustion gas or may be processed or otherwise refined to produce synthetic gases and fuels.

24 Claims, 5 Drawing Sheets

U.S. PATENT DOCUMENTS

| | | | |
|---|---|---|---|
| 4,373,454 | A | 2/1983 | Pitrolo et al. |
| 4,429,646 | A | 2/1984 | Quesnel |
| 4,444,258 | A | 4/1984 | Kalmar |
| 4,507,269 | A | 3/1985 | Dean et al. |
| 4,543,894 | A | 10/1985 | Griswold et al. |
| 4,579,070 | A | 4/1986 | Lin et al. |
| 4,627,964 | A | 12/1986 | Audeh |
| 4,854,249 | A | 8/1989 | Khinkis et al. |
| 4,940,569 | A | 7/1990 | Neal et al. |
| 4,948,468 | A | 8/1990 | Reeves et al. |
| 5,008,005 | A | 4/1991 | Shang |
| 5,055,029 | A | 10/1991 | Avidan et al. |
| 5,139,755 | A | 8/1992 | Seeker et al. |
| 5,141,708 | A | 8/1992 | Campbell, Jr. et al. |
| 5,176,088 | A | 1/1993 | Amrhein et al. |
| 5,220,875 | A * | 6/1993 | Cox .......................... 110/345 |
| 5,571,490 | A | 11/1996 | Bronicki et al. |
| 5,827,352 | A | 10/1998 | Altman et al. |
| 5,967,098 | A | 10/1999 | Tanca et al. |
| 5,983,810 | A * | 11/1999 | Siniakevith et al. ......... 110/346 |
| 6,101,959 | A | 8/2000 | Bronicki et al. |
| 6,143,263 | A | 11/2000 | Johnson et al. |
| 6,712,878 | B2 | 3/2004 | Chang et al. |
| 7,384,615 | B2 * | 6/2008 | Boardman et al. .......... 423/210 |
| 2005/0205462 | A1 | 9/2005 | Gopalakrishnan et al. |
| 2006/0112639 | A1 | 6/2006 | Nick et al. |
| 2006/0120933 | A1 | 6/2006 | Boardman et al. |
| 2007/0010588 | A1 | 1/2007 | Pearson |

OTHER PUBLICATIONS

"Combustion of Municipal Solid Wastes with Oil Shale in a Circulating Fluidized Bed," Department of Energy Grant No. DE FG01 94CE15612, Jun. 6, 1996, Energy Related Inventions Program Recommendation No. 612, Inventor R.L. Clayson, NIST Evaluator H. Robb, Consultant J.E. Sinor.

McCarthy, Harry E., "Fluidized-Bed Combustion of Oil Shale," $16^{th}$ Oil Shale Symposium Proceedings, Colorado School of Mined Press, Jon W. Raese, Editor, 1983.

Sinor, Jerry E., "Niche Market Assessment for a Small Scale Western Oil Shale Project," Report No. DOE/MC/11076 2759, work performed under Cooperative Agreement DE-FC21-86MC11076, Jul. 1989.

U.S. Dept. of Energy, Clean Coal Technology, vol. 1, "Clean Coal Technology Programs: Program Update 2003," as of May 2003 (Dec. 2003).

U.S. Dept. of Energy, Clean Coal Technology, vol. 2, "Clean Coal Technology Programs: Completed Projects 2003," as of May 2003 (Dec. 2003).

Stolworthy et al., U.S. Appl. No. 11/749,788, filed May 17, 2007, Oil Shale Based Method and Apparatus for Emission Reduction in Gas Streams.

PCT International Preliminary Report on Patentability and Written Opinion for PCT/US08/59649, dated Nov. 26, 2009, 8 pages.

* cited by examiner

OIL SHALE DERIVED POLLUTANT CONTROL MATERIALS AND METHODS AND APPARATUSES FOR PRODUCING AND UTILIZING THE SAME

CROSS-REFERENCE TO RELATED APPLICATIONS

This application is a continuation-in-part of U.S. patent application Ser. No. 11/004,698, entitled "METHOD AND APPARATUS FOR OIL SHALE POLLUTANT SORPTION/$NO_x$ REBURNING MULTI-POLLUTANT CONTROL," which was filed on Dec. 2, 2004, now U.S. Pat. No. 7,384,615, issued Jun. 10, 2008, and which is incorporated by reference herein in its entirety. This application is also related to U.S. patent application Ser. No. 11/749,788, filed May 17, 2007.

GOVERNMENT RIGHTS

This invention was made with government support under Contract Numbers DE-AC07-99ID13727 and DE-AC07-05ID14517 awarded by the United States Department of Energy. The government has certain rights in the invention.

BACKGROUND OF THE INVENTION

1. Field of the Invention

The invention relates to the production of pollutant sorbents, the reduction of pollutants, and energy providing fuels. Generally, the invention relates to the use of oil shale and oil shale products as sorbents or reductants for reducing pollutants, and, in particular, to the thermal processing of oil shale to produce pollutant absorbing and adsorbing solids and combustible or reducing gases.

2. State of the Art

Coal, oil, natural gas, oil shale, oil sands, and other carbon-containing fuel feedstock materials (for example: forestry industry products, byproducts, and residues; agriculture crops, byproducts, and residues; animal wastes and carcasses; municipal solid waste, sewage sludge solids, construction and demolition debris, waste tires, and other forms of refuse-derived fuel) can be converted from chemical potential energy to heat and gaseous products that can be used to generate electrical power, or to produce higher value chemicals and components.

In the context of this document, the term "thermal conversion" generally implies any gaseous or solid process that liberates or transforms the chemical potential energy into heat, hot gases, combustible gases, combustible liquids, combustible solids such as char, and/or non-combustible solids such as ash or calcined minerals, or any subset of these.

Thermal conversion of such gaseous and solid materials produces various pollutants, such as nitrogen compounds or sulfur compounds, which are believed to be involved in the formation of smog and acid rain. If the fuel includes mercury, the combustion also produces mercury compounds, which have been identified by the Environmental Protection Agency ("EPA") as a significant toxic pollutant. Air pollutant control legislation, such as the Clean Air Act ("CAA"), the Clean Air Interstate Regulation ("CAIR"), and the Clean Air Mercury Regulation ("CAMR"), regulate emissions of many of the pollutants released from thermal conversion processes.

The composition of the pollutant species produced by thermal conversion processes is a strong function of the availability of oxygen in the process. Under the reducing conditions of pyrolysis and gasification, sulfur bound in the fuel is typically converted to reduced forms of sulfur, such as hydrogen sulfide, carbonyl sulfide, and carbon disulfide. Nitrogen contained in the fuel is converted to reduced nitrogen compounds, including ammonia, hydrogen cyanide, and molecular nitrogen. Most of the mercury in a fuel is converted to volatile elemental mercury ("$Hg^o$") and speciated mercury, such as mercury chloride ("$HgCl_2$"). Under reducing conditions, phosphorus ("P") reacts with metals to form phosphate compounds, and may also be converted to phosphine ("$PH_3$"), phosphonium compounds, and other reduced forms of phosphorus. Chlorine ("Cl") may react with alkali metals (such as sodium and potassium), alkali-earth metals (such as calcium and magnesium), and other metals (such as mercury, zinc, and iron), but it is also converted to diatomic chlorine gas ("$Cl_2$") and hydrochloric acid gas ("HCl"). Fluorine, bromine, and iodine behave similar to chlorine.

Under the oxidizing conditions of combustion, sulfur bound in the fuel is converted to gaseous sulfur dioxide or sulfur trioxide. These sulfur compounds quickly equilibrate with moisture ("$H_2O$") to form sulfuric acid ("$H_2SO_4$"). Nitrogen bound in the fuel is converted to nitric oxide and nitrogen dioxide or other oxides of nitrogen. Combustion with air also results in nitrogen oxides as a result of high temperature reactions of atomic oxygen ("O") and hydroxide radicals with molecular nitrogen. Phosphorus, chlorine, fluorine, bromine, and iodine are readily converted to phosphoric acid ("$H_3PO_4$"), hydrochloric acid ("HCl"), and hydrofluoric acid ("HF"), bromous acid ("HBrO"), and iodic acid ("$HIO_3$"), as well as other reactive volatile compounds. These acid gases are corrosive to equipment used in combustion processes, such as in a combustion device or in boiler tubes in a combustor. Therefore, it is desirable to limit the formation of the acid gases or to remove the acid gases close to their point of generation in a combustion device or thermal conversion process.

Various technologies have been developed to decrease emissions from coal-fired powerplants. Limestone has been used as a sorbent for $SO_x$ pollutants, as disclosed in U.S. Pat. No. 3,995,006 to Downs et al., U.S. Pat. No. 5,176,088 to Amrhein et al. ("Amrhein"), and U.S. Pat. No. 6,143,263 to Johnson et al. This technology is known as limestone injection multiple burner ("LIMB") technology or limestone injection dry scrubbing ("LIDS") technology. The limestone is injected into a region of a furnace having a temperature of 2,000° F. to 2,400° F.

Limestone (mainly $CaCO_3$) and dolomite ("$CaCO_3$—$MgCO_3$") and their derivatives have also been shown to react with $H_2S$. Either uncalcined limestone or dolomite, half-calcined dolomite, fully calcined limestone or dolomite, lime, or hydrated lime ("CaOH") will react to form calcium sulfide ("CaS") or magnesium sulfide ("MgS").

Organic and amine reducing agents, such as ammonia or urea, are used to selectively reduce $NO_x$ pollutants, as disclosed in U.S. Pat. No. 3,900,554 to Lyon. This technique is known as selective noncatalytic reduction ("SNCR"). The reducing agent is injected into a furnace at a temperature from about 975 K to about 1375 K so that a noncatalytic reaction selectively reduces the $NO_x$ to molecular nitrogen ("$N_2$"). The ammonia is injected into a region of the furnace having a temperature of 1,600° F. to 2,000° F.

The LIMB and SCNR technologies have been combined to simultaneously remove the $NO_x$ pollutants and the $SO_x$ pollutants. The limestone is used to absorb the $SO_x$ pollutants while the ammonia is used to reduce the $NO_x$ pollutants. However, this combination technology is expensive to implement and adds increased complexity to the process.

NO$_x$ reburning has also been used to remove the NO$_x$ pollutants, as disclosed in U.S. Pat. No. 5,139,755 to Seeker et al. In NO$_x$ reburning, the coal is combusted in two stages. In the first stage, a portion of the coal is combusted with a normal amount of air (about 10% excess), producing the NO$_x$ pollutants. In the second stage, the remaining portion of the coal is combusted in a fuel-rich environment. Hydrocarbon radicals formed by combustion of the coal react with the NO$_x$ pollutants to form N$_2$. Fuel/air staging has also been used to reduce the NO$_x$ pollutants. Fuel and air are alternately injected into a combustor to provide a reducing zone where the nitrogen in the fuel is evolved, which promotes the conversion of the nitrogen to N$_2$. The air is injected at a separate location to combust the fuel volatiles and char particles. By staging or alternating the fuel and the air, the local temperature and the mixture of air and fuel are controlled to suppress the formation of the NO$_x$ pollutants. Fuel/air staging attempts to prevent NO$_x$ formation while NO$_x$ reburning promotes NO$_x$ reduction and destruction.

To absorb mercury or mercury-containing pollutants, activated carbon is used as a sorbent, as disclosed in U.S. Pat. No. 5,827,352 to Altman et al., and U.S. Pat. No. 6,712,878 to Chang et al. The activated carbon is present as a fixed or fluidized bed or is injected into the flue gas.

Oil shale is a sedimentary rock that includes an inorganic matrix of carbonate, oxide, and silicate compounds impregnated with a polymeric material called kerogen. Kerogen is an organic substance that is insoluble in petroleum solvents. When heated, the kerogen pyrolyzes to produce gas, oil, bitumen, and an organic residue. Pyrolyzing the kerogen is also known as retorting. Oil shale also includes carbonate minerals, such as calcium carbonate, and other hydrocarbon materials, such as paraffins, cycloparaffins, aliphatic and aromatic olefins, single ring aromatics, aromatic furans, aromatic thiophenes, hydroxyl-aromatics, dihydroxy aromatics, aromatic pyrroles, and aromatic pyridines, and other polynuclear aromatic hydrocarbons. Oil shale is typically co-located with coal and oil and is found in various regions of the western United States, such as in Utah, Colorado, and Wyoming, and in the eastern United States, such as in Virginia and Pennsylvania. Large deposits of oil shale are also found in Canada, Australia, Europe, Russia, China, Venezuela, and Morocco. Given the abundance of oil shale throughout the world, its value would be significant if beneficial uses are identified and employed. Oil shale utilization has not been presently appreciated due to the high cost of recovering the kerogen from the shale.

When oil shale containing considerable amounts of calcium carbonate is heated, the calcium carbonate undergoes calcination, which is an endothermic reaction in which the calcium carbonate ("CaCO$_3$") is converted to lime ("CaO"). For each kilogram of calcium carbonate that is calcined, as much as 1.4 MJ to 1.6 MJ (or about 600 British Thermal Units ("BTU") to 700 BTU per pound mass) of the available heat energy is consumed. This loss of energy translates to a process efficiency penalty when limestone or dolomite is used as an injected sorbent. In the case of oil shale, the kerogen can be oxidized to offset the heat sink associated with carbonate calcination.

To extract energy from the oil shale, the oil shale can be heated in a retorting zone of a fluidized bed reactor vessel to a temperature sufficient to release, but not combust, volatile hydrocarbons from the oil shale, as disclosed in U.S. Pat. No. 4,373,454 to Pitrolo et al. The temperature used in the retorting zone provides minimal calcination of the calcium carbonate. The volatile hydrocarbons flow to a combustion zone of the fluidized bed combustor, where the volatile hydrocarbons are combined with excess air and are combusted. Calcination of the calcium carbonate occurs in the combustion zone. During retorting, nitrogen compounds in the oil shale are converted to NO$_x$ compounds and are reduced to nitrogen and water or oxygen by the volatile hydrocarbons.

Oil shale has been used to absorb SO$_2$ and HCl in a circulating fluidized bed, as disclosed in "Combustion of Municipal Solid Wastes with Oil Shale in a Circulating Fluidized Bed," Department of Energy Grant No. DE-FG01-94CE15612, Jun. 6, 1996, Energy-Related Inventions Program Recommendation Number 612, Inventor R. L. Clayson, NIST Evaluator H. Robb, Consultant J. E. Sinor and in "Niche Market Assessment for a Small-Scale Western Oil Shale Project," J. E. Sinor, Report No. DOE/MC/11076-2759.

Many of the pulverized coal combustors in operation do not meet the new standards promulgated by the United States Environmental Protection Agency under CAIR and CAMR. Upwards of about 75 percent of all currently existing pulverized coal combustors may have to be phased out or retrofit to satisfy the new pollutant standards.

BRIEF SUMMARY OF THE INVENTION

The present invention relates to a method of decreasing pollutants produced in a pyrolysis, combustion, gasification, stream reforming, retorting, calcination, metal refining, ore smelting, cement production, or any other thermal conversion process, which processes are collectively referred to herein as a "thermal conversion" processes. The term "thermal conversion" encompasses equivalent derivate nouns, adjectives, and verb conjugations of this term, such as "combusting" or "combusted," "gasifying" or "gasified," "reforming" or "reformed," "retorting" or "retorted," "calcining" or "calcined" and "pyrolyzing" or "pyrolyzed." The method comprises thermally converting coal or any other carbon-containing fuel in a thermal conversion chamber to produce at least one pollutant selected from the group consisting of a nitrogen-containing pollutant, sulfuric acid, sulfur trioxide, carbonyl sulfide, carbon disulfide, chlorine, hydroiodic acid, iodic acid iodine, hydrofluoric acid, fluorine, hydrobromic acid, bromous acid, bromine, phosphoric acid, phosphorous pentaoxide, phosphine, phosphonium compounds, elemental mercury, and mercuric chloride.

According to some embodiments, oil shale particles are introduced into the thermal conversion chamber and are thermally converted to produce sorbent particulates and a reductant or reactive gas. The shale sorbent particulates and the reductant may generally be produced by thermally converting the oil shale particles at a temperature necessary to pyrolyze, retort, or devolatilize kerogen, for example, at a temperature of greater than or equal to approximately 200° C.

In some embodiments, the oil shale particles may be introduced into a thermal conversion process used to react with any carbonaceous fuel, including oil shale itself. Such processes shall be referred to as "in-situ" oil shale conversion processes.

In other embodiments, the oil shale particles may be introduced into a separate, independent, or auxiliary thermal conversion process used to convert the oil shale particles into shale sorbent particles and reactive gas. These sorbent particles and reactive gases may be routed, conveyed, or transported separately or in combination to a coupled carbon-containing fuel thermal conversion process. Such processes may generally be referred to as "ex-situ" oil shale conversion processes. The shale sorbent particles may act as a pollutant sorbent or as a pollutant reductant.

The oil shale particles may be thermally converted to shale sorbent particles and reducing or reactive gas in a close-coupled reactor using the heat or the hot gases produced by a primary carbonaceous fuel thermal conversion process. Such processes can generally be referred to as a "close-coupled" oil shale conversion processes.

The oil shale particles may be introduced into at least one of a burner or combustion zone, a gasification zone, a superheater zone, a reheat zone, or an economizer zone of any tangentially fired, wall-fired, or cyclonic pulverized-coal combustion chamber. The at least one pollutant is contacted with at least one of the sorbent particulates and the reductant to decrease an amount of the at least one pollutant in the combustion chamber. The reductant may chemically reduce the at least one pollutant, such as by reducing the nitrogen-containing pollutant to molecular nitrogen, water, and carbon dioxide. The sorbent particulates may be used to adsorb or absorb the at least one pollutant, such as adsorbing or absorbing at least one of sulfuric acid, sulfur trioxide, carbonyl sulfide, carbon disulfide, chlorine, hydroiodic acid, iodic acid, iodine, hydrofluoric acid, fluorine, hydrobromic acid, bromous acid, bromine, phosphoric acid, phosphorous pentaoxide, phosphine, phosphonium compounds, elemental mercury, and mercuric chloride.

The present invention also relates to a combustion chamber for producing decreased pollutants in a combustion process. The combustion chamber may also comprise a burner zone that is configured to combust coal and to produce at least one pollutant selected from the group consisting of a nitrogen-containing pollutant, sulfuric acid, sulfur trioxide, carbonyl sulfide, carbon disulfide, chlorine, hydroiodic acid, iodic acid, iodine, hydrofluoric acid, fluorine, hydrobromic acid, bromous acid, bromine, phosphoric acid, phosphorous pentaoxide, phosphine, phosphonium compounds, elemental mercury, and mercuric chloride. The burner zone is also configured to thermally convert oil shale particles to produce sorbent particulates and a reductant, which are contacted with the at least one pollutant. The burner zone may be configured to contact the nitrogen-containing pollutant with the reductant to reduce the nitrogen-containing pollutant to molecular nitrogen, carbon dioxide, and water.

The combustion chamber also comprises at least one of a combustion zone, gasification zone, superheater zone and a reheat zone that are each configured to thermally convert the oil shale particles to produce the sorbent particulates and the reductant. The superheater zone and the reheat zone are also each configured to contact the sorbent particulates and the reductant with the at least one pollutant. The combustion chamber also comprises at least one of an economizer zone, an air preheat zone, and a gas cleaning unit, which are each configured to contact the sorbent particulates and the reductant with the at least one pollutant. Each of the superheater zone, the reheat zone, the economizer zone, the air preheat zone, and the gas cleaning zone is configured to contact at least one of sulfuric acid, sulfur trioxide, carbonyl sulfide, carbon disulfide, chlorine, hydroiodic acid, iodic acid, iodine, hydrofluoric acid, fluorine, hydrobromic acid, bromous acid, bromine, phosphoric acid, phosphorous pentaoxide, phosphine, phosphonium compounds, elemental mercury, and mercuric chloride with the sorbent particulates to adsorb or absorb at least one of these pollutants.

In one embodiment, the combustion chamber is configured as a pulverized coal combustor.

In other embodiments of the invention, oil shale may be introduced into a pryolyzer, a gasifier, a combustion reactor, a retorting reactor, a metal refining process, ore smelting process, cement kiln, or any other thermal converter to liberate kerogen from the oil shale, which produces a kerogen-based pyrolysis gas and shale sorbent particles.

In other embodiments of the invention, oil shale may be introduced into a packed bed that is contacted either directly or indirectly with the hot gases produced by a pryolyzer, a gasifier, a combustor, a retort, or any other thermal converter to liberate kerogen from the oil shale, which produces a kerogen-based pyrolysis gas and shale sorbent particles.

The pyrolysis gas produced according to embodiments of the invention may be used as a reductant gas for reducing pollutants such as nitrogen-containing pollutants in various processes. The pyrolysis gas may also be used as a combustion gas or heating gas which may be fed to a combustion process or to various combustion zones of a combustor. In other embodiments, the pyrolysis gas may be processed, refined, or otherwise altered to produce synthetic gas and fuel products such as syngas and synfuels.

The shale sorbents produced according to embodiments of the invention may be used to reduce pollutants produced in a process such as a coal combustion process, a gasification process, a pyrolysis process, a metal refining or smelting process, a cement production process, or other thermal conversion process where nitrogen-containing pollutants, sulfur-containing pollutants, mercury-containing pollutants, or other pollutants are produced. Introduction of the shale sorbent produced according to embodiments of the invention into a process may result in the contact of the shale sorbent with a pollutant such that the shale sorbent absorbs or adsorbs the pollutant, thereby reducing the amount of pollutants in the process.

According to still other embodiments of the invention, the shale sorbent may be used to form cement clinker or other additives used to enhance cement production.

BRIEF DESCRIPTION OF THE SEVERAL VIEWS OF THE DRAWINGS

While the specification concludes with claims particularly pointing out and distinctly claiming that which is regarded as the present invention, the advantages of this invention may be more readily ascertained from the following description of the invention when read in conjunction with the accompanying drawing in which:

DETAILED DESCRIPTION OF THE INVENTION

Figure 1:
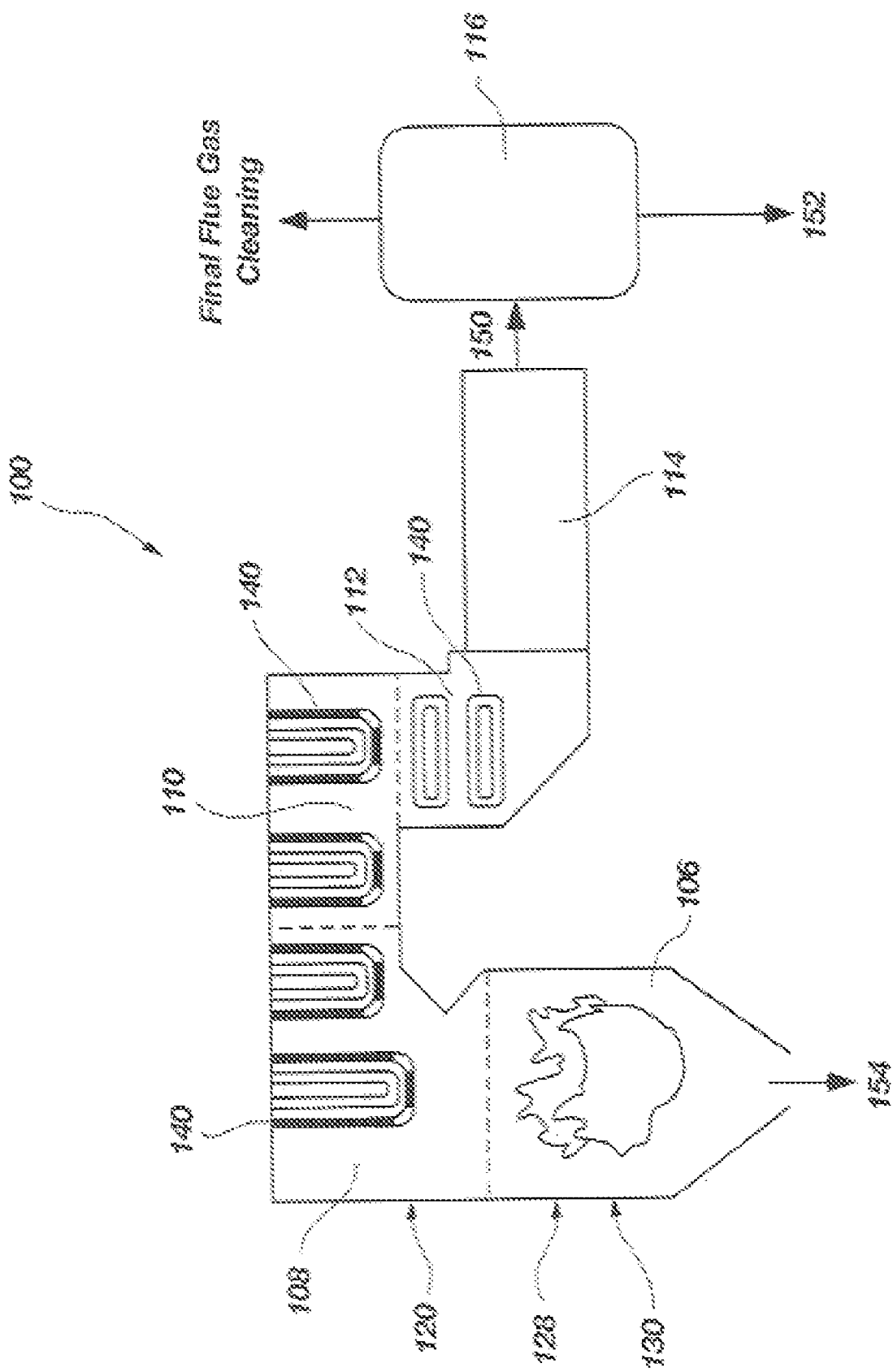
FIG. 1 is a schematic illustration of an embodiment of a pulverized coal combustor in which in-situ conversion of oil shale is used to decrease pollutant levels.

Oil shale has been used to decrease or eliminate one or more pollutants produced during combustion of a primary fuel, such as coal, biomass, municipal solid waste ("MSW"), refuse derived fuel ("RDF"), mixtures thereof, or other fuel feed stocks. For example, U.S. Pat. No. 7,384,615, which is incorporated herein in its entirety by reference, describes processes wherein oil shale may be added to a combustion chamber burning a primary fuel to reduce the amount of pollutants within the combustion chamber and the combustion process. During combustion of a primary fuel, the oil shale may function as a sorbent to decrease an amount of the pollutant(s) released from the combustion chamber. Alternatively, combustion of the oil shale may produce a reductant, which reduces the pollutant(s) to a more benign chemical species, decreasing the amount of the pollutant(s) released. By adjusting or controlling a temperature or the gas composition in the combustion chamber, the pollutant(s) may be adsorbed or absorbed onto the oil shale or may be reduced by the reductant produced by the oil shale. The pollutant(s) may be removed from the combustion chamber by contacting the pollutant with the oil shale for a sufficient amount of time for the oil shale to function as a sorbent or for the reductant to chemically reduce the pollutant(s). The amount of time sufficient to remove the pollutant(s) is referred to herein as a residence time or a contact time. Pollutants that may be decreased or eliminated by the addition of oil shale to a thermal conversion process chamber may include, but are not limited to, nitrogen-containing pollutants, sulfur-containing pollutants, acid gases, and metals. Nitrogen-containing pollutants may include, for example, NO, $NO_2$, $N_2O$, $N_2O_5$, or mixtures thereof. Sulfur-containing pollutants may include, for example, $SO_2$, $SO_3$, $H_2SO_4$, $H_2S$, COS, $CS_2$, or mixtures thereof. In some instances, $SO_2$ may be a major sulfur-containing pollutant and $SO_3$ a minor sulfur-containing pollutant produced during combustion of primary fuels that contain sulfur. In other instances, $H_2S$ and COS may be major sulfur-containing pollutants produced during pyrolysis, gasification, or thermal conversion of sulfur-containing primary fuels. Acid gases may include, but are not limited to, halide-containing volatile gases, such as HCl, chlorine ("$Cl_2$"), hydroiodic acid ("HI"), iodic acid ("$HIO_3$") iodine ("$I_2$"), hydrofluoric acid ("HF"), fluorine ("F"), hydrobromic ("HBr"), bromous acid ("HBrO"), bromine ("Br"), or mixtures thereof.

Acid gases may also include phosphate-containing gases, such as phosphoric acid ("$H_3PO_4$"), phosphorus pentaoxide ("$P_2O_5$"), phosphine ("$PH_3$"), any phosphonium compounds, or mixtures thereof. Metal pollutants may include one or more elemental metals or one or more metal compounds including, but not limited to, elemental mercury ("$Hg^o$"), mercuric chloride ("$HgCl_2$"), mercury adsorbed on particulate matter, lead ("Pb") or compounds thereof, arsenic ("As") or compounds thereof, chromium ("Cr") or compounds thereof, or mixtures thereof. The oil shale may be used to remove a single pollutant or multiple pollutants from the combustion chamber. In one embodiment, the oil shale is used to remove nitrogen-containing pollutants, $H_2SO_4$, $SO_3$, $SO_2$, $H_2S$, COS, $CS_2$, elemental mercury, and mercuric chloride from the combustion chamber.

Pollution control processes used with combustion chambers have included processes where oil shale is fed directly to a combustion chamber and, more particularly, directly to a burner portion of a combustion chamber. In such processes, when the oil shale is heated in the combustion chamber, shale minerals, char particles, and kerogen are produced, as shown in Reaction 1:

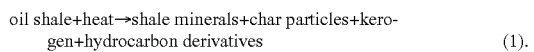

A temperature of greater than or equal to approximately 200° C. may be used to pyrolyze or retort the oil shale. As the oil shale is heated, the heat may cause the kerogen to depolymerize and devolatilize while the shale minerals may be calcined. The extent of depolymerization, devolatilization, pyrolysis, and char formation of the oil shale may vary depending on particle heat up rates, particle temperature, surrounding gas temperature, surrounding gas temperature, and an amount of time that the oil shale is heated. When the kerogen is devolatilized or released from the oil shale, a porous matrix of oxides, carbonates, or silicates may remain including, but not limited to, oxides, carbonates, or silicates of calcium ("Ca"), magnesium ("Mg"), sodium ("Na"), potassium ("K"), iron ("Fe"), or zinc ("Zn"). These oxides, carbonates, and silicates are collectively referred to herein as the shale minerals. For the sake of example only, the shale minerals may include, but are not limited to, calcium oxide, magnesium oxide, iron oxide, calcium carbonate, or mixtures thereof. The char particles or particles of residual carbon may also remain after the kerogen is devolatilized from the oil shale. The shale minerals and char particles are collectively referred to herein as sorbent particulates or shale sorbent particles. The sorbent particulates are porous particles that have an increased surface area. As such, the sorbent particulates have an increased adsorption or absorption capability relative to that of the oil shale and may be used to adsorb or absorb mercury and other pollutants, as explained in detail below. Since the sorbent particulates are porous, the pollutants may readily diffuse into the sorbent particulates and react with the oxides, carbonates, and silicates therein.

When oil shale is introduced into a thermal conversion chamber, kerogen in the oil shale is released. The kerogen released from the oil shale may provide a source of the reductant used to reduce the nitrogen-containing pollutants in the thermal conversion chamber. As shown in Reaction 2, the kerogen may be exposed to additional heat to crack or scission the kerogen, forming light and heavy hydrocarbons:

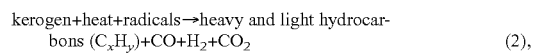

where x and y depend on the carbon and hydrogen ratio in the kerogen and temporal conditions. For instance, x may range from 1 to 7 for a light hydrocarbon, from approximately 8 to 13 for an intermediate hydrocarbon, or from approximately 14 to 42 for a heavy hydrocarbon. In correlation, y may range from 1 to 90 and is typically equal to nominally two times "x" for a given hydrocarbon. A temperature of greater than or equal to approximately 350° C. may be used to crack and scission the polymeric kerogen. The heavy hydrocarbons are thus progressively converted to lighter hydrocarbons. The presence of steam helps crack and reform the heavy hydrocarbons. The heavy and light hydrocarbons may be used to reduce the nitrogen-containing pollutants to $N_2$, carbon dioxide ("$CO_2$"), and water ("$H_2O$") by heating the heavy and light hydrocarbons to a temperature of greater than or equal to approximately 400° C. according to the chemistries shown in Reactions 3 and 4:

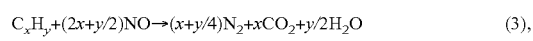

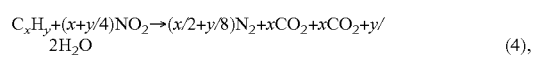

where x is typically 1 or 2 and y is typically 1, 2, 3, or 4. Generally, Reactions 3 and 4 show the reduction of oxidized compounds of nitrogen to a reduced nitrogen compound, such as $N_2$. Oil shale char will also reduce nitrogen-containing pollutants to $N_2$, $CO_2$, and $H_2O$ by heterogeneous reactions according or similar to the chemistries shown in Reactions 5 and 6:

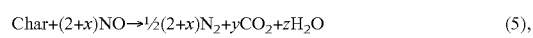

$$\text{Char} + (2+x)NO_2 \rightarrow \tfrac{1}{2}(2+x)N_2 + yCO_2 + zH_2O \quad (6),$$

where x, y, and z are dependent on the carbon to hydrogen ratio in the char.

The shale minerals or char particles resulting from the combustion of the oil shale may also have an affinity for chemical bonding with mercury or mercury compounds (adsorption) and for physical bonding with mercury or mercury compounds (absorption). Therefore, the shale minerals or char particles produced by the pyrolysis of the oil shale (see Reaction 1) may adsorb or absorb mercury or mercuric chloride according to the chemistries shown in Reactions 7, 8, 9, and 10:

$$\text{char particles} + Hg^\circ \rightarrow \text{char particles}-Hg^\circ \quad (7),$$

$$\text{char particles} + HgCl_2 \rightarrow \text{char particles}-HgCl_2 \quad (8),$$

$$\text{shale minerals} + Hg^\circ \rightarrow M\text{-}Hg^\circ \quad (9),$$

$$\text{shale minerals} + HgCl_2 \rightarrow M\text{-}HgCl_2 \quad (10),$$

where M is a metal or metal compound present in the oil shale that has affinity for mercury or mercuric chloride. M may include, but is not limited to, any one of Fe, Zn, lead ("Pb"), silver ("Ag"), aluminum ("Al"), cadmium ("Cd"), chromium ("Cr"), nickel ("Ni"), titanium ("Ti"), selenium ("Se"), arsenic ("As"), or sulfur ("S"), including sulfur that has been captured by the particle. When the shale minerals or char particles come into contact with these pollutants for a sufficient residence time, the sorbent particulates may capture the elemental mercury or mercuric chloride. The adsorption or absorption of the elemental mercury or mercuric chloride by the shale minerals or char particles may also depend on a temperature at which the shale minerals or char particles contact the elemental mercury or mercuric chloride. The temperature may be maintained so that is it favorable for chemical or physical adsorption, so as not to dissociate; for example, at a temperature of less than or equal to approximately 200° C. in some embodiments. This temperature may be achieved in a number of locations in the combustion chamber, such as in a process duct, in a particle cake collected by a gas cleaning unit, such as a baghouse or electrostatic precipitator ("ESP"), or in a packed-bed/gas reactor.

Other volatile and semi-volatile metals that may be removed by the shale sorbent char and inorganic ash produced by the thermal conversion process, include lead, arsenic, beryllium, and other metals liberated from the carbon-containing fuel materials by the thermal conversion process.

Carbonate or oxide compounds produced by the combustion of the oil shale may also be used to remove sulfur-containing pollutants, such as $H_2SO_4$, $SO_3$, $SO_2$, $H_2S$, COS, $CS_2$, or mixtures thereof, according to the chemistries shown in Reactions 11-19:

$$M_x\text{-}(CO_3)_y + \text{heat} \rightarrow M_x\text{-}O_y + yCO_2 \quad (11),$$

$$CaCO_3 + SO_2 + \tfrac{1}{2}O_2 \rightarrow CaSO_4 + CO_2 \quad (12),$$

$$CaCO_3 + SO_3 \rightarrow CaSO_4 + CO_2 \quad (13),$$

$$CaCO_3 + H_2SO_4 \rightarrow CaSO_4 + CO_2 + H_2O \quad (14),$$

$$CaCO_3 + H_2S \rightarrow CaS + H_2O + CO_2 \quad (15),$$

$$CaO + SO_2 + \tfrac{1}{2}CaSO_4 \quad (16),$$

$$CaO + SO_3 \rightarrow CaSO_4 \quad (17),$$

$$CaO + H_2SO_4 \rightarrow CaSO_4 + H_2O \quad (18),$$

$$CaO + H_2S \rightarrow CaS + H_2O \quad (19),$$

where M is a metal, such as Ca, Mg, Na, K, Fe, or Zn, and where x and y vary depending on the metal carbonates present in the oil shale. For instance, x may be 1 or 2 and y may be 1, 2, or 3. While the reactions shown above are between $SO_2$, $SO_3$, $H_2SO_4$, or $H_2S$ and calcium carbonate or calcium oxide, similar reactions may occur between $SO_2$, $SO_3$, or $H_2S$ and carbonates or oxides of Mg, Na, K, Fe, or Zn.

When COS, $CS_2$, or a combination of COS and $CS_2$ are present in the gas produced by a thermal conversion process such as a pyrolysis process or a gasifier, COS and $CS_2$ may be shifted to $H_2S$ using a shift reactor according to the Reactions 20 and 21:

$$COS + H_2O \rightarrow H_2S + CO_2 \quad (20),$$

$$CS_2 + 2H_2O \rightarrow 2H_2S + CO_2 \quad (21),$$

which may be followed by Reactions 15 and 19.

The shift reactions illustrated by Reactions 20 and 21 may be promoted by Ca, Mg, Na, K, Cu, Fe, Al, and other elements or mineral compounds contained in the oil shale or oil shale sorbents.

The shale minerals, such as the carbonate compounds, may be calcined by heating the oil shale to a temperature greater than or equal to approximately 450° C. The adsorption of the sulfur-containing pollutant may occur in a location of the combustion chamber where the temperature is relatively hot. The temperature may be sufficiently high to achieve favorable reaction of the sulfur-containing pollutant with the alkali compounds, alkaline-earth compounds, or other metal oxides present in the oil shale to produce sulfate or sulfide compounds. However, the temperature may be less than the dissociation temperatures of the compounds. To achieve reaction between the shale minerals and the $H_2SO_4$, $SO_2$, $SO_3$, $H_2S$, COS, or $CS_2$, a temperature ranging from greater than or equal to approximately 450° C. to less than approximately 1150° C. may be used.

The shale minerals, such as the carbonate or oxide compounds, may also be used to remove HCl and $Cl_2$ according to the example chemistries shown in Reactions 22 and 23:

$$CaO + 2HCl \rightarrow CaCl_2 + H_2O \quad (22),$$

$$CaO + Cl_2 \rightarrow CaCl_2 + \tfrac{1}{2}O_2 \quad (23).$$

While the reactions shown above are between calcium oxide and chlorine-containing compounds, similar reactions may occur between HCl or $Cl_2$ and Mg, Na, K, Fe, or Zn. Similar reactions may also occur with fluorine, fluorine-containing compounds, iodine, iodine-containing compounds, bromine, bromine-containing compounds, phosphate, and phosphate-containing compounds. The adsorption of fluorine, fluorine-containing compounds, iodine, iodine-containing compounds, bromine, bromine-containing compounds, phosphate, and phosphate-containing compounds may occur in a location of the thermal conversion process chamber where the temperature is relatively hot. The temperature may be sufficiently high to achieve favorable reaction of the fluorine, fluorine-containing compounds, iodine, iodine-containing compounds, bromine, bromine-containing compounds, phosphate, and phosphorus-containing compounds with the alkali compounds, alkaline-earth compounds, or other metal oxides present in the oil shale to produce halogen or phosphorus compounds. However, the temperature may be less than the dissociation temperatures of the compounds. For example, for the reaction of HCl with the shale minerals, the temperature of the reaction may be maintained from greater than or equal to approximately 450° C. to less than approximately 1150° C.

In processes such as those described in U.S. Pat. No. 7,384, 614, the oil shale used in and fed to combustion chambers may include ore that is obtained from a conventional oil shale mine and pulverized into particles. The oil shale may be obtained from a source, such as mines in Utah, Colorado, or Wyoming that yield approximately 10 gallons of oil per ton of ore to approximately 80 gallons of oil per ton of ore. Other sources of oil shale around the world may also be used, each of which contain varying concentrations of kerogen and other minerals. The oil shale may initially be ground or milled to a desired coarse particle size of less than or equal to approximately 5 cm (approximately 2 inches). The oil shale may be ground using conventional techniques, similar to the crushing and grinding techniques used in coal mining. The oil shale particles may be further pulverized into microsize particles having a particle size ranging from approximately 2 µm to approximately 150 µm, which are introduced into the combustion chamber. The microsize particles may be pulverized, classified, and entrained in an air stream using conventional techniques, similar to the techniques for pulverizing, classifying, and entraining coal in an air stream. As such, existing coal pulverizers, classifiers, and injectors may be used to produce and inject the oil shale particles into the combustion chamber. The oil shale particles may be unreacted, in that the oil shale particles have not been pyrolyzed or devolatilized. However, oil shale retort (devolatilized oil shale particles) may also be used in the combustion chamber.

To decrease the amount of the pollutants produced by combustion of a primary fuel, oil shale particles may be introduced into a combustion chamber, for example, a pulverized coal combustor ("PCC"), a furnace, a boiler, a fluidized bed combustor or gasifier, a circulating bed combustor or gasifier, a staged reactor combustor or gasifier, an entrained-flow combustor or gasifier, an offgas duct, an offgas cleanup transport reactor, a packed-bed combustor or gasifier, a rotary-bed combustor or gasifier, or calcining devices such as a cement kiln. Oil shale particles may also be used in a metallurgical process, such as during the production of iron ore or the smelting or refining of metals. A combustion chamber may be configured to combust coal or other fossil fuels, biomass, MSW, RDF, or other carbon-containing feedstock materials. While some embodiments herein describe using the oil shale particles in a PCC, oil shale particles may be used in other types of thermal conversion chambers as long as the thermal conversion chamber is capable of producing the temperatures at which the reactions with the oil shale particles occur. In addition, while the embodiments herein describe using coal as a primary fuel, other fuels, such as oil, natural gas, oil shale, oil sands, and other carbon-containing fuel feedstock materials (for example: forestry industry products, byproducts, and residues; agriculture crops, byproducts, and residues; animal wastes and carcasses; municipal solid waste, sewage sludge solids, construction and demolition debris, waste tires, and other forms of refuse-derived fuel) may be used.

PCCs are designed to burn coal as a primary fuel and to convert the chemical energy (enthalpy) of the burning coal into heat, which is transferred to steam tubes to produce super-heated, high pressure steam. PCCs typically produce from approximately 50 MW$_e$ to approximately 1000 MW$_e$ of energy. PCCs typically comprise a long, vertical burner box that is lined with the steam tubes or has pendant arrangements of the steam tubes. PCCs are known in the art and, therefore, are not discussed in further detail herein. A schematic illustration of a PCC 100 into which oil shale particles 120 may be introduced is shown in FIG. 1. The PCC 100 includes a burner zone 106, a superheater zone 108, a reheat zone 110, an economizer zone 112, an air preheat zone 114, and a gas cleaning unit 116. To decrease the pollutants produced by combusting the coal in the PCC 100, the temperature in each of these zones may be controlled to achieve the desired reactions between the pollutants and the kerogen and between the pollutants and the sorbent particulates.

Pulverized coal 128 may be introduced into the burner zone 106 of the PCC 100 and combusted with air 130. An amount of pulverized coal 128 added to the PCC 100 may depend on an efficiency of the PCC 100 and its desired power output. A feed rate at which the pulverized coal 128 is introduced into the PCC 100 may be calculated based on the efficiency of the PCC 100 and desired power output, as known in the art. The pulverized coal 128 may be entrained with the air 130 and injected into the PCC 100 through multiple burners (not shown), which are also referred to in the art as burner registers or burner boxes. Alternatively, the pulverized coal 128 may be injected into the burner zone 106 through primary ports (not shown). The air 130 may be injected with the pulverized coal 128 or may be injected through secondary or tertiary ports (not shown). To combust the pulverized coal 128, the burner zone 106 may be maintained at a temperature ranging from approximately 1085° C. to approximately 1625° C. (approximately 2000° F. to approximately 3000° F.). Upon combustion, nitrogen present in the pulverized coal 128 and the air 130 may be converted to nitrogen-containing pollutants. Sulfur in the pulverized coal 128, such as organically bound sulfur or inorganic or pyrite-phase sulfur, may be released and oxidized or converted to the sulfur-containing pollutants, such as $H_2SO_4$, $SO_2$, $SO_3$, $H_2S$, COS, $CS_2$, or mixtures thereof. Chlorine in the pulverized coal 128 may be converted to HCl, $Cl_2$, or other volatile chlorine compounds. Iodine in the pulverized coal 128 may be converted to HI, $I_2$, or other volatile iodine compounds while fluorine in the pulverized coal 128 may be converted to HF, F, or other volatile fluoride compounds. Bromine in the pulverized coal 128 may be converted to HBr, Br, or other volatile bromide compounds. Phosphorus in the pulverized coal 128 may be converted to phosphorous-containing compounds. Mercury present in the pulverized coal 128 may be released as Hg° or $HgCl_2$. Arsenic, lead, beryllium, and other toxic metals may be released as volatile and semi-volatile compounds.

The oil shale particles 120 may be entrained and injected into the PCC 100 in at least one of the burner zone 106, the superheater zone 108, and the reheat zone 110, depending on the temperature profile of the PCC 100 and the properties of the oil shale. For the sake of clarity and simplicity, the oil shale particles 120 are shown in FIG. 1 as being injected into the superheater zone 108. The oil shale particles 120 may be injected into the PCC 100 through multiple burners (not shown), primary ports (not shown), or secondary or tertiary ports (not shown). The oil shale particles 120 are not injected into a zone of the PCC 100 where the oil shale particles 120 would fuse and slag since this may affect the ability of the oil shale particles 120 to capture the pollutant in later stages of the gas exit path. A feed rate at which the oil shale particles 120 are introduced into the PCC 100 may depend on the efficiency of the sorbent reactions. This feed rate may be determined as known in the art. In one embodiment, the oil shale particles 120 are injected into an upper region of the burner zone 106 or a lower region of the superheater zone 108. Oil shale retort (devolatilized oil shale particles) may also be injected into the reheat zone 110. After being injected into the PCC 100, the oil shale particles 120 may begin to devolatilize and release the kerogen, which reacts with the nitrogen-containing pollutant as described in Reactions 1-4. The temperature in at least one of the burner zone 106, the superheater zone 108, and the reheat zone 110 may be maintained so that it is favorable to chemical reduction of the nitrogen-containing pollutants to $N_2$, $CO_2$, and $H_2O$, significantly decreasing the amount of the nitrogen-containing pollutants that exit the PCC 100.

The shale minerals produced after the kerogen is released may react with gaseous $H_2SO_4$, $SO_3$, $SO_2$, HCl, $H_2S$, COS, $CS_2$, or mixtures thereof as described in Reactions 9-17. Calcium oxide, magnesium oxide, iron oxide, and other metal oxides from the oil shale may react and capture the $H_2SO_4$, $SO_3$, $SO_2$, HCl, $H_2S$, COS, $CS_2$, or mixtures thereof when the reaction kinetics and thermodynamics are favorable for the formation of $CaSO_4$ or CaS. Generally, favorable reactions may occur at a temperature ranging from approximately 450° C. to approximately 1125° C. Temperatures within this range may occur in at least one of the superheater zone 108, the reheat zone 110, and the economizer zone 112. Therefore, the capture of the HCl, $H_2SO_4$, $SO_3$, $SO_2$, $H_2S$, COS, $CS_2$, or mixtures thereof may occur as the oil shale particles 120 pass out of the superheater zone 108 and into the reheat zone 110 and the economizer zone 112. The capture of the HCl, $H_2SO_4$, $SO_3$, $SO_2$, $H_2S$, COS, $CS_2$, or mixtures thereof may also continue into a lower portion of the air preheat zone 114. A residence time or contact time between the shale minerals and the pollutants may be greater than or equal to approximately 5 seconds to capture these pollutants.

Mercury or mercuric chloride may react with the shale minerals or char particles by two mechanisms: physical absorption or chemical adsorption. As the shale minerals or char particles pass into portions of the PCC 100 having cooler temperatures, mercury or mercuric chloride may be adsorbed or absorbed, as described in Reactions 5-8. For instance, mercury or mercuric chloride may be adsorbed or absorbed by the sorbent particulates in the air preheat zone 114 or the gas cleaning unit 116. These reactions may occur when the temperature drops below approximately 200° C. (approximately 392° F.). Since temperatures within this range may occur in the air preheat zone 114 or the gas cleaning unit 116, these portions of the PCC 100 may be the most effective in removing mercury or mercuric chloride. To effectively capture these pollutants, the contact time between the sorbent particulates and the mercury or mercuric chloride may be greater than approximately 30 seconds. Such long contact times may be achieved in the gas cleaning unit 116.

The hot gases and entrained flyash particles produced by combusting the pulverized coal 128 may exit the burner zone 106 and pass into the superheater zone 108, where the hot gases contact the steam tubes 140. The steam tubes 140 extract heat from the hot gases and increase the steam temperature. In the superheater zone 108, the temperature of the hot gases ranges from approximately 975° C. to approximately 1320° C. (from approximately 1800° F. to approximately 2400° F.). The hot gases and entrained flyash particles may pass into the reheat zone 110, which is a transition zone between the superheater zone 108 and the economizer zone 112. Steam tubes 140 may also be present in the reheat zone 110. The temperature in the reheat zone 110 may vary from approximately 650° C. to approximately 980° C. (from approximately 1200° F. to approximately 1800° F.). The hot gases may be cooled in the economizer zone 112 by additional steam tubes 140. The temperature of the hot gases in the economizer zone 112 may range from approximately 535° C. to approximately 650° C. (from approximately 1000° F. to approximately 1200° F.).

The gases that exit the economizer zone 112 are referred to in the art as flue gas. At this point, the flue gas may include air, combustion products, water vapor, carbon dioxide, mercury, and particulate matter. The flue gas may be substantially free of the nitrogen-containing pollutants, the sulfur-containing pollutants, and HCl because these pollutants are removed in the burner zone 106, the superheater zone 108, or the reheat zone 110. The flue gas may be further cooled by gas-to-gas heat exchangers (not shown) in the air preheat zone 114 to preheat the incoming combustion air. The temperature of the flue gas in the air preheat zone 114 may range from approximately 120° C. to approximately 230° C. (from approximately 250° F. to approximately 450° F.). Flue gas 150 may flow into the gas cleaning unit 116, such as the baghouse or electrostatic precipitator (ESP), to remove the particulate matter, such as the flyash 152. The flyash 152 may be collected on a filter in the gas cleaning unit 116.

Since introducing the oil shale particles 120 into the PCC 100 utilizes many existing coal handling and processing technologies, this method of decreasing levels of pollutants in the flue gas 150 may be readily implemented in existing PCCs because it does not require the installation of new equipment. The use of the oil shale particles 120 may also be incorporated into future PCC designs without significant costs.

As described above, the oil shale particles 120 may be used to decrease the amount of a single type of pollutant, such as a nitrogen-containing pollutant, $H_2SO_4$, $SO_3$, $SO_2$, $H_2S$, COS, $CS_2$, mercury, or mercury chloride, in the flue gas 150. The oil shale particles 120 may also be used to decrease the amount of different types of pollutants in the flue gas 150. Therefore, the oil shale particles 120 may provide multi-pollutant control. In addition, since pyrolization of the oil shale particles 120 produces porous sorbent particulates, higher pollutant loadings may be achieved. As such, lower injection rates of the oil shale particles 120 may be used, which decreases the amount of solid material for disposal. While the oil shale particles 120 effectively decrease the pollutant levels in the flue gas 150, the oil shale particles 120 may also be used in combination with other technologies to further decrease the amounts of the pollutants, such as the LIMB, LIDS, SNCR, and $NO_x$ reburning technologies.

In addition to removing the pollutants, the oil shale particles 120 may add enthalpy (i.e., heating value) since the oil shale particles 120 are combusted along with the primary fuel. The char particles and the heavy and light hydrocarbons, which are produced during the combustion of the oil shale, may be fully or partially combusted to provide additional heat, as shown by Reactions 24-31:

$$C_xH_y + (x+y/4)O_2 \rightarrow xCO_2 + y/2H_2O \qquad (24),$$

$$CO + \tfrac{1}{2}O_2 \rightarrow CO_2 \qquad (25),$$

$$C_xH_y + x/2O_2 \rightarrow xCO + y/2H_2 \qquad (26),$$

$$C_xH_y + xH_2O \rightarrow xCO + (x+y/2)H_2 \qquad (27),$$

$$\text{Char carbon} + O_2 \rightarrow CO_2 \qquad (28),$$

$$\text{Char carbon} + \tfrac{1}{2}O_2 \rightarrow CO \qquad (29),$$

$$\text{Char carbon} + CO_2 \rightarrow 2CO \qquad (30),$$

$$\text{Char carbon} + H_2O \rightarrow CO + H_2 \qquad (31).$$

While not all of Reactions 24-31 are exothermic, the reactions either produce heat or produce reactive gases that may be used to produce heat. The oil shale may provide a net positive heat of combustion that ranges from approximately 4.7 MJ/kg (or approximately 2,000 BTU/lb) to approximately 9.3 MJ/kg (or approximately 4,000 BTU/lb). The energy provided by the combustion of the oil shale may offset the heat lost due to the pollutant sorption reactions.

The unreacted heavy and light hydrocarbons may be completely reacted in the superheater zone 108 or the reheat zone 110 with excess oxygen or air (not shown) that is introduced. In addition, supplementary oxygen (not shown) may be added to the superheater zone 108 or the reheat zone 110 as needed to combust the heavy and light hydrocarbons. Most combustion chambers are equipped with soot blowing air injectors or air lances, which may be used to adjust the oxygen concentration to achieve complete combustion of the heavy and light hydrocarbons.

Using the oil shale particles 120 in the combustion process may also improve the disposal of flyash produced during the combustion of the primary fuel. The combustion of the oil shale may also produce flyash 152 and slag 154 (coal and oil shale byproduct mineral matter). The oil shale particles 120 may be used to make the flyash 152 or the slag 154 suitable for disposal in a landfill. During combustion, the oil shale particles 120 are calcined and converted to a pozzolanic material that includes oxide compounds. The pozzolanic material may encapsulate and immobilize the metals, slag 154, and flyash 152 produced during the combustion. The flyash 152 may also be used as a road bed material or a construction material.

Not only may oil shale be used as an agent to reduce pollution in a combustion process, metal pyrolysis process, calcination process, or other processes, devolatilized oil shale may also be used as a pollutant control material. Kerogen in oil shale may be reacted and devolatilized in an ex-situ thermal conversion process to produce shale minerals and char particles and a combustible kerogen-based fuel. The shale minerals and char particles may be fed to a separate, coupled thermal conversion process, such as, but not limited to, a combustion process, a cement kiln, or ore smelting or metals refining processes, to absorb or adsorb pollutants in much the same way that the shale minerals produced by the addition of oil shale to a combustion process absorb and adsorb pollutants. In addition, the kerogen-based fuel may also be fed to the process to act as a reduction agent to remove pollutants. Alternatively, the kerogen-based fuel may be used as a heating fuel or may be processed into useful fuel products.

Embodiments of the invention involve the devolatilization of kerogen from oil shale to produce a shale sorbent and a kerogen-based fuel. The devolatilization of kerogen from oil shale may be controlled such that desired characteristics of shale sorbent and kerogen released from the oil shale may be produced.

According to certain embodiments of the invention, the gasification, pyrolysis, devolatilization, or retorting of oil shale may be performed to produce a solid ash, or shale sorbent, having pollutant sorbent qualities. Oil shale may be introduced to a gasification process to controllably release kerogen from the oil shale. The controlled release of kerogen from the oil shale may result in the formation of a solid ash having pollutant control characteristics. For instance, the shale sorbent may act as a sorbent for pollutants or as a reductant for pollutants.

For example, oil shale may be introduced to a gasification process where the oil shale undergoes gasification to release kerogen from the oil shale. The gasification may be controlled to release large amounts of kerogen stored in the oil shale. Devolatilized oil shale exits the gasification process as a shale sorbent. The shale sorbent may be ground or otherwise processed to produce a shale sorbent having the desired size for use with processing operations to adsorb or absorb pollutants or to otherwise be used as a pollution sorbent. In some embodiments, the shale sorbent may be fed to a process to control pollutants in the process or contacted with process products to reduce pollutants therein.

According to other embodiments of the invention, the gasification of oil shale may be controlled to produce solid particles of pollutant sorbent, wherein the particles include fixed carbon which may assist in the absorption or adsorption of pollutants. The gasification of the oil shale may be controlled to ensure that portions of the oil shale are charred to produce a shale sorbent having an amount of carbon contained within or on the shale sorbent particles. The charred shale sorbent may be collected and used as a pollutant control sorbent.

According to still other embodiments of the invention, the gasification of oil shale may produce a reducing gas that may be used for pollutant control. For example, a gas that may be used in the reduction of $NO_x$ emissions may be produced according to embodiments of the invention. The devolatilization of kerogen from oil shale introduced to a gasification process to produce a reducing gas may include control and optimization of the devolatilization process to produce a gas having high quantities of reduced forms of carbon, such as $CH_4$, $C_2H_4$, $C_2H_6$, $C_3H_8$, and low quantities of heavy hydrocarbons. The reducing gas may be fed directly to a process or process product streams where it may be used as a reducing gas or it may be stored according to conventional methods and used with other processes.

In other embodiments of the invention, a hydrocarbon gas may be produced by the gasification of oil shale. The devolatilization of kerogen from oil shale may be controlled to produce hydrocarbon gases. The devolatilization conditions may be controlled such that particular amounts of desired hydrocarbons are produced from the gasification process. In this manner, hydrocarbon gases may be formed that can be separated and marketed as synthetic natural gases or that can be altered to produce synthetic gases and gas products. Hydrocarbon gas streams may also be produced which may be cooled, condensed, and then distilled, cracked, or hydrogenated to produce higher value synthetic petroleum crude products.

Figure 2:
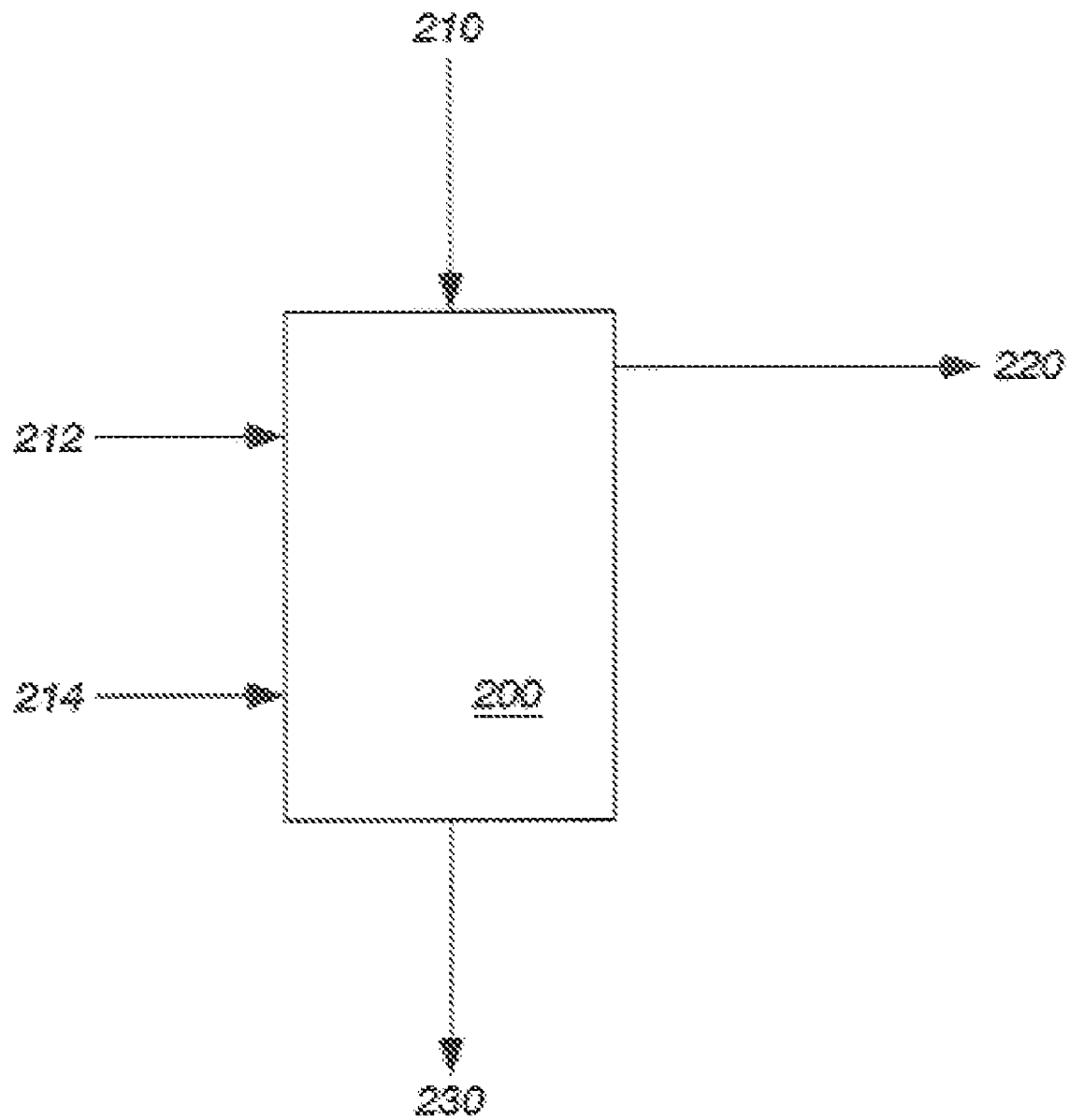
FIG. 2 illustrates a simplified flow diagram of a thermal converter for producing pyrolysis gases and shale sorbents according to embodiments of the invention.

FIG. 2 illustrates a simplified material flow diagram of a pyrolysis or gasifier system that may be used to carry out embodiments of the invention. As illustrated in FIG. 2, ground oil shale 210 may be introduced into a gasifier 200 with steam 212 and one or more oxidizer gases 214. The gasification of the oil shale 210 introduced into the gasifier 200 may cause the devolatilization of kerogen from the oil shale 210, which may result in the production of a pyrolysis gas 220 and a shale sorbent 230. The pyrolysis gas 220 may be removed from the gasifier 200 and stored, burned, utilized, or otherwise processed as desired. Similarly, the shale sorbent 230 may be used as a pollution sorbent according to embodiments of the invention or may be used with other processes.

The gasifier 200 represented by the block diagram illustrated in FIG. 2 may include any type of gasifier 200 or thermal conversion unit capable of devolatilizing the kerogen from oil shale and capable of calcining the shale to produce a shale sorbent. For example, conventional fixed-bed gasifiers, fluid-bed gasifiers, or entrained-flow gasifiers may be used with embodiments of the invention. Other conventional gasifiers or rotary-driven pyrolysis operations may also be used with embodiments of the invention.

According to those embodiments of the invention where the oil shale 210 is being devolatilized of kerogen to produce a shale sorbent 230 to capture pollutants from other processes, a fixed-bed or bubbling fluidized-bed gasifier may be used to gasify the oil shale 210. The use of such a gasifier 200 may even be preferred if the oil shale 210 particles being devolatilized of kerogen include crushed, coarse oil shale 210 particles with sizes, for example, between about 0.5 mm to 10 mm in diameter. The use of a fixed-bed or bubbling fluidized-bed gasifier may help to produce high quality shale sorbent 230 wherein most of the kerogen contained in the oil shale 210 is removed from the oil shale 210 within the gasifier 200. The shale sorbent 230 produced in such a manner may have a high "loss on ignition" value. Other types of gasifiers may also be used to produce such shale sorbents 230.

In those embodiments of the invention where the oil shale 210 includes a finely ground oil shale 210, such as oil shale having particle sizes between about 0.001 mm to about 0.01 mm diameter, an entrained gasifier may be used as gasifier 200 to devolatilize kerogen from the oil shale 210. For example, oil shale 210 particles having a diameter of between about 0.001 mm and about 0.01 mm may be introduced into an entrained gasifier 200 to devolatilize kerogen therefrom. The pyrolysis gases 220 produced from the devolatilization process may be burned within the gasifier 200 to aid in the devolatilization process.

The choice of gasifiers 200 for use with embodiments of the invention may also depend upon the pyrolysis gases 220 desired from the process. For example, when the pyrolysis gases 220 are to be burned or otherwise used as reducing gases to reduce the presence of $NO_x$ pollutants or other pollutants in other gas streams, the gasifier 200 or other thermal conversion process may be selected to optimize the production of reduced forms of carbon, such as $CH_4$ and $C_2H_4$.

The production of heavy hydrocarbons in a pyrolysis gas may not be desired; therefore, a gasifier 200 or other thermal conversion process may be selected to limit the production of such heavy hydrocarbons. For instance, the presence of heavy hydrocarbons in a feed stream from a gasifier 200 to a secondary process may cause unwanted condensation of the feed stream. In some embodiments, the pyrolysis gas 220 exiting the gasifier 200 or other thermal conversion process may be routed to a tar cracker (not shown) or a gas reformer (not shown) to further break down or otherwise remove the heavy hydrocarbons from the pyrolysis gas 220. Conventional processes may be used to alter or change the heavy hydrocarbons in a pyrolysis gas 220 stream before the pyrolysis gas 220 stream is routed to another process.

In other embodiments of the invention, the production of reduced forms of hydrocarbons in the pyrolysis gas 220 may not be desirable. For example, in syngas and synfuel production processes, the amount of hydrocarbons in the pyrolysis gas 220 is preferably minimized. Instead, the production of carbon monoxide ("CO") and hydrogen ("$H_2$") is preferably maximized. Therefore, a gasifier 200 or other thermal conversion process may be selected to maximize the production of carbon monoxide and hydrogen during the pyrolysis of the oil shale 210 in the gasifier 200. In some embodiments, the gasifier 200 may even be selected or operated to produce an optimized ratio of carbon monoxide and hydrogen for Fischer-Tropsch synthetic fuel production processes.

The introduction of oil shale 210, steam 212, and oxidizer gas 214 to a gasifier 200 as illustrated in FIG. 2 may result in a number of different reactions within the gasifier 200 or other thermal conversion process. For example, when oil shale 210 is heated in the gasifier 200 or other thermal conversion process, shale minerals, char particles, and kerogen are produced. The shale minerals and char particles make up the shale sorbent 230. The production of the shale minerals, char particles, and kerogen is similar to the reaction that occurs when oil shale 210 is introduced directly into a combustion chamber or other thermal conversion process, such as a combustion chamber of a pulverized coal boiler. The formation of the shale sorbent 230 and kerogen may be represented by Reaction 32:

oil shale+heat→shale sorbent+kerogen  (32).

A temperature of greater than or equal to approximately 200° C. may be used to pyrolyze the oil shale 210 in a gasifier 200 or other thermal conversion process. As the oil shale 210 is heated, the heat may cause the kerogen to depolymerize and devolatilize while the shale minerals may be calcined. The extent of depolymerization, devolatilization, pyrolysis, and char formation of the oil shale 210 may vary depending on particle heat up rates, particle temperature, surrounding gas temperature, and the amount of time that the oil shale 210 is heated in the gasifier 200 or other thermal conversion process. When the kerogen is devolatilized or released from the oil shale 210, a porous matrix of oxides, carbonates, or silicates may remain including, but not limited to, silicon dioxide ("$SiO_2$"), and oxides, and carbonates of calcium ("Ca"), magnesium ("Mg"), sodium ("Na"), potassium ("K"), iron ("Fe"), or zinc ("Zn"). For the sake of example only, the shale minerals may include, but are not limited to, calcium oxide, magnesium oxide, iron oxide, calcium carbonate, or mixtures thereof. The char particles or particles of residual carbon may also remain after the kerogen is devolatilized from the oil shale 210. The shale sorbent 230 comprises the shale minerals and char particles. The shale sorbent 230 may include porous particles that have an increased surface area. As such, the shale sorbent 230 may have an increased adsorption or absorption capability relative to that of the oil shale 210 and may be used to adsorb or absorb mercury and other pollutants. In addition, the shale sorbents 230 may be porous, allowing pollutants to diffuse into the shale sorbent 230 and react with the oxides, carbonates, and silicates therein.

The introduction of steam 212 into the gasifier 200 or other thermal conversion process may react with the char particles of the shale sorbent 230, forming activated carbon within, or on, the shale sorbent 230 as represented by Reaction 33:

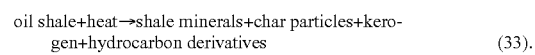

oil shale+heat→shale minerals+char particles+kerogen+hydrocarbon derivatives  (33).

Kerogen in the oil shale 210 may be released within the gasifier 200. Kerogen released from the oil shale 210 may provide a source of a reductant used to reduce pollutants in other processes. As shown in Reaction 34, the kerogen may be exposed to additional heat to crack or scission the kerogen, forming light and heavy hydrocarbons:

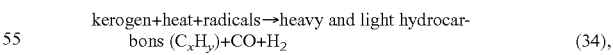

kerogen+heat+radicals→heavy and light hydrocarbons ($C_xH_y$)+CO+$H_2$  (34), where x and y depend on the carbon and hydrogen ratio in the kerogen and temporal conditions. For instance, x may range from 1 to 7 for a light hydrocarbon, from 8 to 12 for an intermediate hydrocarbon, or from 12 to 42 for a heavy hydrocarbon. In correlation, y may range from 1 to 90 and is typically equal to two times x for a given hydrocarbon. A temperature of greater than or equal to approximately 350° C. may be used to crack and scission the polymeric kerogen. The heavy hydrocarbons are thus progressively converted to lighter hydrocarbons. The presence of steam helps crack and reform the heavy hydrocarbons.

Embodiments of the invention may be incorporated with any pollution producing processes to reduce the amount of pollution produced in a process. For example, a gasifier 200 for converting oil shale 210 to pyrolysis gases 220 and shale sorbent 230 may be incorporated with a pulverized coal boiler, a cement production process, a synfuels or syngas production process, a metallurgy pyrolysis process, a pulverized coal combustor, a furnace, a boiler, fluidized bed combustor or gasifier, a circulating bed combustor or gasifier, a staged reactor combustor or gasifier, an entrained-flow combustor or gasifier, an offgas duct, or an offgas cleanup transport reactor. The embodiments of the invention may be used to produce a shale sorbent 230 for absorbing or adsorbing pollutants produced in the respective processes or to produce a kerogen-based fuel that may be used with the processes. Embodiments of the invention are not limited to these recited uses and it is understood that a gasifier for producing shale sorbents 230, pyrolysis gases 220, or pollutant reduction gases may be incorporated with many conventional processes and especially processes which produce pollutants which are desired to be controlled.

Figure 3:
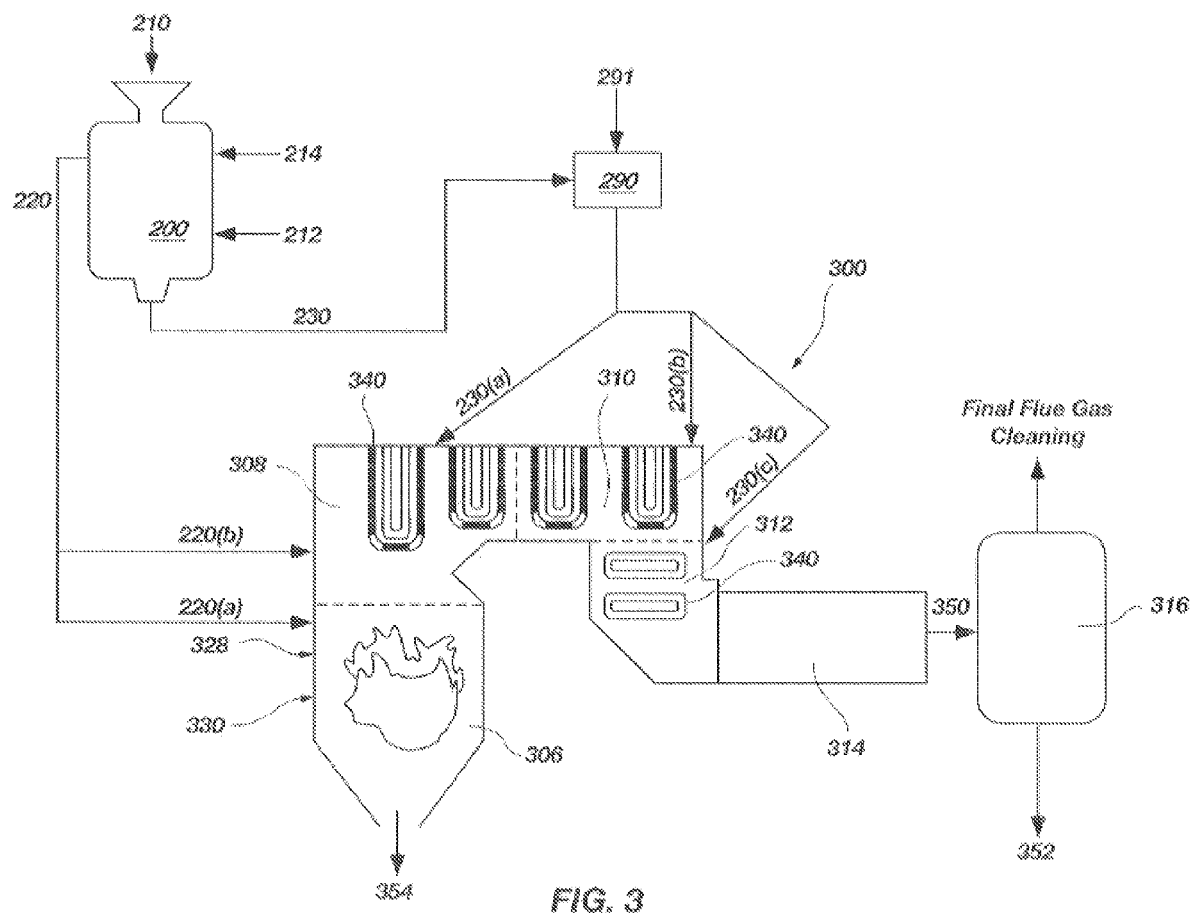
FIG. 3 is a schematic illustration of a coal boiler system and a thermal converter used to produce ex-situ reducing gas and oil shale solid sorbent according to embodiments of the invention.

The incorporation of a gasifier 200 or other thermal conversion process according to embodiments of the invention with a pollutant forming process is illustrated in FIG. 3. As illustrated, a gasifier 200 or other thermal conversion process may be incorporated with a pulverized coal boiler system 300. The incorporation of a gasifier 200 or other thermal conversion process according to embodiments of the invention with a pulverized coal boiler system 300 may be used to provide shale sorbent 230, pyrolysis gas 220, or reduction gases to the pulverized coal boiler system 300. Although the system illustrated in FIG. 3 includes a gasifier 200 or other thermal conversion process incorporated with a coal boiler system 300, it is understood that embodiments of the invention may be incorporated with many different systems where pollutants are generated and where reduction of such pollutants is desired.

As illustrated in FIG. 3, a conventional coal boiler system 300 may include a burner zone 306, a superheater zone 308, a reheat zone 310, an economizer zone 312, an air preheat zone 314, and a gas cleaning unit 316. Coal 328, such as pulverized coal, may be introduced into the burner zone 306 where it may undergo combustion, forming gases and slag 354. Air 330 may also be introduced into the burner zone 306 to facilitate the combustion of the coal 328 in the coal boiler system 300. The introduction of air 330 may include the introduction of combustion air, primary air, and infiltration air as known with a conventional coal boiler system 300. Slag 354 produced in the burner zone 306 may be removed from the coal boiler system 300 as conventionally known.

The coal 328 may be combusted in the burner zone 306, which may be maintained at a temperature of about 800° C. to about 1650° C. Reactions within the burner zone 306 include reactions related to the combustion of coal 328, such as Reactions 35 through 44:

$$C + O_2 \rightarrow CO_2 \quad (35),$$

$$2H + \tfrac{1}{2}O_2 \rightarrow H_2O \quad (36),$$

$$N + \tfrac{1}{2}O_2 \rightarrow NO \quad (37),$$

$$2N \rightarrow N_2 \quad (38),$$

$$2Cl + H_2O \rightarrow 2HCl + \tfrac{1}{2}O_2 \quad (39),$$

$$S + O_2 \rightarrow SO_2 \quad (40),$$

$$2O \rightarrow O_2 \quad (41),$$

$$2FeS_2 + 11\tfrac{1}{2}O_2 \rightarrow Fe_2O_3 + 4SO_2 \quad (42),$$

$$HgS \rightarrow Hg° + SO_2 \quad (43),$$

$$\text{Carbonates} \rightarrow \text{Oxide} + CO_2 \quad (44).$$

As indicated by the reactions which occur during the combustion of coal 328, pollutants such as $SO_2$, NO, and HCl may be produced. Other pollutants may also be formed. The pollutants are undesirable and may be removed by the burning of pyrolysis gases 220 from a gasifier 200 or other thermal conversion process according to embodiments of the invention or by the introduction of shale sorbent 230 into the coal boiler system 300.

Gases and particulates formed during the combustion of the coal 328 exit the burner zone 306 and enter the superheater zone 308. The gases and particulates from the superheater zone 308 pass into the reheat zone 310 and then into the economizer zone 312 before entering the air preheat zone 314. Temperatures in each of the zones may be controlled by the presence of steam tubes 340 in each of the zones. Flue gases 350 exiting the air preheat zone 314 may be fed to a gas cleaning unit 316, such as a baghouse or electrostatic precipitator (ESP). Particulate matter, such as flyash 352, may be collected from the gas cleaning unit 316 and the waste gases from the coal boiling system 300 may be released or fed to other gas cleaning processes.

According to embodiments of the invention, pollutants produced in the burner zone 306 and throughout the remainder of the coal boiler system 300 may be reduced by the introduction of shale sorbent 230 or pyrolysis gases 220 into the coal boiler system 300 or into product streams produced by the coal boiler system 300. For example, $NO_x$ pollutants formed in the burner zone 306 of the coal boiler system 300 may be reduced by the simultaneous burning of pyrolysis gases 220 formed from the gasification of oil shale 210 in the burner zone 306. The pyrolysis gases 220 from a gasifier 200 may be fed from the gasifier 200 to an input in the burner zone 306 of the coal boiler system 300. When fed or otherwise injected into the burner zone 306, the pyrolysis gases 220 may be oxidized by the presence of NOR, thereby reducing the nitrogen-containing pollutants to $N_2$ or other nitrogen-containing compounds, carbon dioxide ("$CO_2$"), and water ("$H_2O$") in accordance with Reactions 3 and 4 previously described.

Additional oxidizing reactions may also occur with the introduction of pyrolysis gas 220 to the burner zone 306. For example, Reactions 45 and 46 may occur within the burner zone 306, in addition to the reduction of $NO_x$ shown in Reactions 3 and 4:

$$C_xH_y + (x + y/4)O_2 \rightarrow xCO_2 + y/2\, H_2O \quad (45),$$

$$CO + \tfrac{1}{2}O_2 \rightarrow CO_2 \quad (46),$$

where x may range from 1 to 7 for a light hydrocarbon, from approximately 8 to 12 for an intermediate hydrocarbon, or from approximately 13 to 42 for a heavy hydrocarbon. In correlation, y may range from 1 to 90 and is typically equal to nominally two times x for a given hydrocarbon. In some instances, the pyrolysis gases 220 may be introduced into the burner zone 306 in two or more locations. The introduction of pyrolysis gases 220 in more than one location may facilitate both the reduction reactions of $NO_x$ pollutants as shown by Reactions 3 and 4 and the oxidation reactions of Reactions 45 and 46. An illustrative example of multiple pyrolysis gas 220 feed inputs into the burner zone 306 is represented by the two pyrolysis gas 220 feed inputs 220(a) and 220(b) illustrated in FIG. 3. As illustrated, one or more of the pyrolysis gas 220 feed inputs 220(b) may be located on a dividing zone between the burner zone 306 and the superheater zone 308 or may be located at the entrance of the superheater zone 308 from the burner zone 306.

Gasses and particulate matter from the burner zone 306 may pass into the superheater zone 308 where additional reactions occur. The superheater zone 308 may be maintained at between about 675° C. and about 1320° C. Steam tubes 340 may be positioned in the superheater zone 308 to provide heat as known with conventional coal boiler systems 300.

Pollutants in the gases and particulate matter produced in the burner zone 306 may be at least partially removed by adsorption or absorption of the pollutants by shale sorbent 230 introduced into the superheater zone 308. Shale sorbent 230 from the gasifier 200 may be introduced into the superheater zone 308 in one or more locations. For instance, shale sorbent 230 from the gasifier 200 may be introduced into the superheater zone 308 of the coal boiler system 300 to absorb and adsorb pollutants transferred from the burner zone 306 to the superheater zone 308. The shale sorbent 230 may be ground to a desired size and entrained in air such that it may be injected into the coal boiler system 300. An example of the introduction of shale sorbent 230 is illustrated in FIG. 3, where the shale sorbent 230 from the gasifier 200 is injected into the superheater zone 308 at inlet 230(a). Although only one shale sorbent 230 inlet 230(a) into the superheater zone 308 is illustrated, it is understood that one or more inlets may be used and that the positioning of the inlets to feed shale sorbent 230 into the superheater zone 308 may be customized to maximize or customize the removal of pollutants from the gases and particulate matter in the superheater zone 308.

Pollutants passed from the superheater zone 308 to the reheat zone 310 of the coal boiler system 300 may also be at least partially removed by the introduction of shale sorbent 230 into the reheat zone 310. Shale sorbent 230 from a gasifier 200 may be introduced into the reheat zone 310 through one or more inlets 230(b) in much the same manner that it may be introduced into the superheater zone 308. Shale sorbent 230 may also be introduced into the economizer zone 312 or air preheat zone 314 to help remove pollutants from the gases and particulates in the coal boiler system 300.

Shale sorbent 230 in the air preheat zone 314 may help to capture mercury and mercury-based pollutants in particulate matter passed to the air preheat zone 314. Shale sorbent 230 may be introduced into the air preheat zone 314 from a gasifier 200 or other source. In addition, shale sorbent 230 introduced in earlier process steps of the coal boiler system 300 may be passed into the air preheat zone 314 where the shale sorbent 230 may react with mercury-containing pollutants in the particulate matter found therein. The reactions of shale sorbent 230 with mercury may include reactions such as those shown by Reactions 5 through 8 herein.

In other embodiments of the invention, the shale sorbent 230 need not be fed to the coal boiler system 300 directly from the gasifier 200 or other thermal conversion process. Instead, shale sorbent 230 produced in a gasifier 200 or other thermal conversion process according to embodiments of the invention may be stored for later use and the stored shale sorbent 230 may be introduced to the coal boiler system 300 at a desired time and in a desired manner. For example, stored shale sorbent 230 from a storage facility may be introduced into one or more shale sorbent 230 inlets 230(a) in a superheater zone 308 of a coal boiler system 300 and into one or more shale sorbent 230 inlets 230(b) in a reheat zone 310 of a coal boiler system 300.

The introduction of shale sorbent 230 into a coal boiler system 300 may reduce pollutants present in the products of the coal boiler system 300, such as particulate matter and gases. The shale sorbent 230 may adsorb or absorb some of the pollutants and may react with others. For example, shale sorbent 230 comprising calcium and magnesium may decrease pollutants according to Reactions 47 and 48:

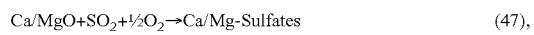

$$Ca/MgO + SO_2 + \tfrac{1}{2}O_2 \rightarrow Ca/Mg\text{-Sulfates} \qquad (47),$$

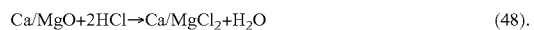

$$Ca/MgO + 2HCl \rightarrow Ca/MgCl_2 + H_2O \qquad (48).$$

The shale sorbent 230 may be introduced into a coal boiler system 300 by entraining the shale sorbent 230 with air and injecting the shale sorbent 230 into the coal boiler system 300 in an air stream. The size of the shale sorbent 230 used may be dependent upon the desired reactions and the pollutant control desired for the type of coal 328 being combusted in the coal boiler system 300. For example, in many coal boiler systems 300, the shale sorbent 230 introduced into the coal boiler system 300 may have a diameter of about 0.002 mm to about 0.015 mm. Shale sorbent 230 having a desired size may be produced in the gasifier 200 or other thermal conversion process by introducing oil shale 210 having sizes which result in the production of the desired shale sorbent 230 sizes into the gasifier 200 or other thermal conversion process. In other embodiments, the shale sorbent 230 produced by the gasifier 200 or other thermal conversion process may be ground to a desired size prior to introduction of the shale sorbent 230 into the coal boiler system 300. For example, as illustrated in FIG. 3, a grinder/classifier 290 may be incorporated with embodiments of the invention to grind the shale sorbent 230 produced by the gasifier 200 into desired particle sizes. Entrainment air 291 may also be introduced to the grinder/classifier 290 to entrain the shale sorbent 230 for delivery to the coal boiler system 300. In other embodiments of the invention, pyrolysis gases 220 may be used to help fire the burners in the burner zone 306 or may be burned to heat water and form steam that is fed to the steam tubes 340. For example, some or all of the pyrolysis gases 220 produced by the gasifier 200 or other thermal conversion process during the gasification of oil shale 210 may be fed directly to the coal boiler system 300 as a source of fuel for burners or for steam generation processes. The pyrolysis gases 220 from the gasifier 200 or other thermal conversion process may also be treated or otherwise processed to produce a desired fuel composition in the pyrolysis gases 220 before such gases are used as fuel for the coal boiler system 300.

According to still other embodiments of the invention, shale sorbent 230 and pyrolysis gases 220 from a gasifier 200 or other thermal conversion process may be introduced into a cement kiln or other calcining process to help control pollutants formed in cement kilns and cement production processes. For example, many cement kiln processes do not meet the new pollution control requirements being promulgated by the Environmental Protection Agency. Incorporation of embodiments of the invention within such cement kiln processes may effectively retrofit the cement kiln processes such that the pyrolysis gases 220 and shale sorbent 230 may be used to reduce pollutants from the cement kiln processes.

Figure 4:
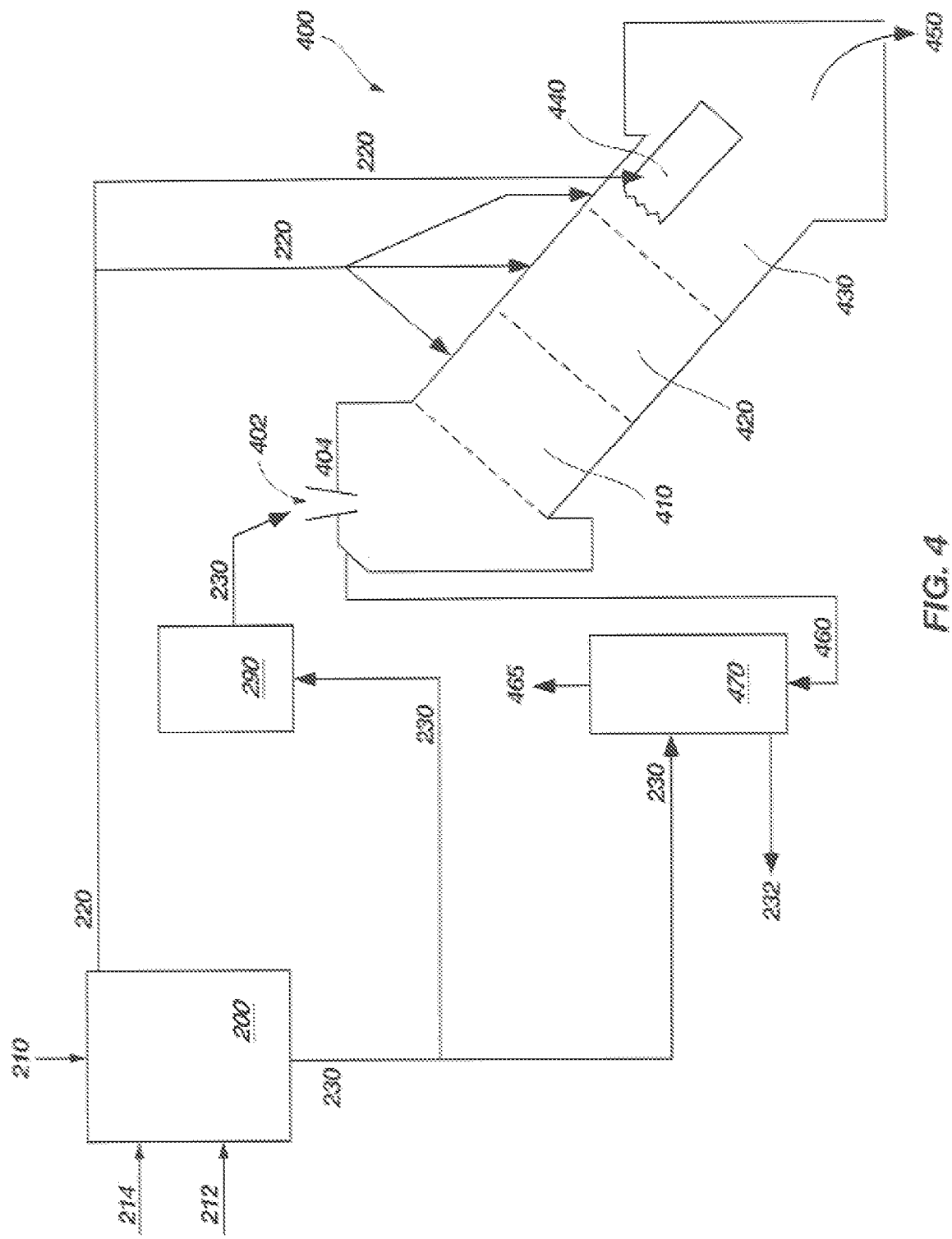
FIG. 4 is a schematic illustration of a cement kiln process and a gasifier according to embodiments of the invention.

A gasifier 200 or other thermal conversion process incorporated with a cement kiln 400 according to particular embodiments of the invention is illustrated in FIG. 4. The cement kiln 400 may include any type of conventional cement kiln or kiln designed for producing cement or cement clinker.

As illustrated in FIG. 4, the cement kiln 400 may include a dehydration zone 410, a calcination zone 420, and a clinkering zone 430. Clay 402 for producing cement clinker may be introduced into the dehydration zone 410 at a solids input 404 according to conventional methods. Moisture in the clay 402 is removed from the clay 402 in the dehydration zone 410 of the cement kiln 400. The temperature in the dehydration zone 410 may be controlled to achieve a desired amount of dehydration based upon the moisture content of the clay 402 being fed to the cement kiln 400. For instance, the temperature in the dehydration zone 410 may be set at between about 400° C. to about 500° C.

Dehydrated clay 402 is transported from the dehydration zone 410 into the calcination zone 420 where the temperature may also be controlled. The temperature in the calcination zone 420 may be between, for example, about 500° C. and about 1250° C. The clay 402 is calcined in the calcination zone 420 according to conventional calcination techniques.

Calcined clay 402 may advance into the clinkering zone 430 where the final heating of the calcined clay 402 forms clinker 450 that may be used with cement. The temperature in the clinkering zone 430 may be controlled between about 1250° C. to about 1550° C. The clinker 450 may exit the cement kiln 400 and may be used according to conventional processes.

Heat may be provided to the cement kiln 400 according to conventional processes, such as by use of gas/oil burners 440 located in or around the clinkering zone 430 of the cement kiln 400. The combustion of gas or oil in the gas/oil burners 440 may be controlled such that the desired temperatures are achieved in the clinkering zone 430, the calcination zone 420, and the dehydration zone 410.

Effluent gases 460 generated in the cement kiln 400 may exit the cement kiln 400 and be fed to a process for cleaning the effluent gases 460 of pollutants before being released into the environment or biosphere. For example, as illustrated in FIG. 4, the effluent gases 460 may exit the cement kiln 400 and be fed to a reactor 470 capable of scrubbing the effluent gases 460 or otherwise reducing the amount of pollutants, if any, in the effluent gases.

According to embodiments of the invention, pyrolysis gases 220 from the gasifier 200 or other thermal conversion process may be burned in the gas/oil burners 440 to provide heat to the cement kiln 400. As illustrated in FIG. 4, a portion of the pyrolysis gases 220 from the gasifier 200 or other thermal conversion process may be fed to the gas/oil burners 440. The gasifier 200 or other thermal conversion process may be operated such that pyrolysis gases 220 produced within the gasifier 200 or other thermal conversion process may be easily burned in the gas/oil burners 440 of the cement kiln 400. In this manner, additional sources of heating gas for the gas/oil burners 440 may be provided by the pyrolysis or gasification of oil shale 210 in a gasifier 200 or other thermal conversion process according to embodiments of the invention.

In other particular embodiments of the invention, at least a portion of the pyrolysis gas 220 produced by the gasifier 200 or other thermal conversion process may be fed to one or more zones of the cement kiln 400 to help reduce pollutants in the various zones of the cement kiln 400. Introduction of the pyrolysis gases 220 into the various zones of the cement kiln 400 may oxidize the pyrolysis gases 220 and reduce pollutants contained in the gases and solids within the cement kiln 400. For instance, pyrolysis gases 220 introduced into various zones of the cement kiln 400 may be oxidized in the presence of $NO_x$ in the cement kiln 400, thereby reducing the nitrogen-containing pollutants to $N_2$ or other nitrogen-containing compounds, carbon dioxide ("$CO_2$"), and water ("$H_2O$") in accordance with Reactions 3 and 4 previously described. Additional oxidization reactions, such as those of Reactions 45 and 46, may also occur as a result of the introduction of pyrolysis gas 220 or pyrolysis gas 220 products into the various zones of a cement kiln 400. Such reactions may be used to reduce the amount of pollutants in the cement kiln 400.

According to still other embodiments of the invention, pyrolysis gases 220 may be fed to a cement kiln 400 from a storage facility or other delivery process. For example, pyrolysis gases 220 produced by a gasifier 200 or other thermal conversion process according to embodiments of the invention may be stored by conventional methods before being used with a cement kiln 400 as gas or fuel feed to a gas/oil burner 440 or as a pollutant control gas in the various zones of the cement kiln 400. Pyrolysis gases 220 from a gasifier 200 or other thermal conversion process according to embodiments of the invention may also undergo further processing before being fed to a cement kiln 400 according to embodiments of the invention. For instance, the pyrolysis gases 220 may be processed to form syngas or synfuels that may be used as a fuel for the gas/oil burners 440 of a cement kiln 400.

The burning of pyrolysis gas 220 in a cement kiln 400 may also reduce the burning of waste tires in a cement kiln 400, which is conventionally done to increase the heat within a cement kiln 400 and to reduce $NO_x$ pollutants. The heat that may be provided by pyrolysis gas 220 may replace the heat generated by the burning of waste tires while still reducing $NO_x$ pollutants. In addition, the removal of the burning of waste tires in the cement kiln 400 may reduce the amounts of sulfur-containing pollutants and mercury-containing pollutants in the cement kiln 400, which are produced by the burning of waste tires.

In other particular embodiments of the invention, pollutants formed or released in a cement kiln 400 may be reduced by the introduction of shale sorbent 230 into the cement kiln 400. Shale sorbent 230 may be introduced into a cement kiln 400 with the introduction of clay 402 or at other locations in the cement kiln 400. As illustrated in FIG. 4, shale sorbent 230 from a gasifier 200 or other thermal conversion process may be combined with clay 402 and introduced in the cement kiln 400 or introduced with the clay 402 into the cement kiln 400. Prior to introduction of the shale sorbent 230 into the cement kiln 400, the shale sorbent 230 may be ground or otherwise processed to achieve a desired size for the shale sorbent 230 entering the cement kiln 400. Shale sorbent 230 introduced into a cement kiln 400 may act as a reducing agent for $NO_x$ pollutants found in the cement kiln 400 and particularly in the upper end of the cement kiln 400 around the dehydration zone 410 and calcination zone 420.

According to other embodiments, the shale sorbent 230 introduced into a cement kiln 400 clinkering process may entrain pollutants produced in the process. For example, mercury-containing pollutants formed during the clinkering process may be adsorbed or absorbed by the shale sorbent 230 added to the clinkering process. Mercury or mercuric chloride formed in the cement kiln 400 and entrained in the cement retort being formed into cement clinker 450 may come into contact with shale sorbent 230 added to the clinkering process. Contact between the shale sorbent 230 and the mercury-containing compounds may result in the capture of the mercury in the shale sorbent 230 in a manner similar to Reactions 7-10. In those instances where mercury or mercuric chloride pollutant removal are desired, the shale sorbent 230 may be formed in a gasifier 200 or other thermal conversion process such that the amount of char or activated carbon in the shale sorbent 230 is maximized for the reduction or capture of mercury-containing compounds.

The introduction of shale sorbent 230 into a cement kiln 400 during a clinkering process may also reduce the amount of other pollutants found in the cement retort or cement clinker 450 of the cement kiln 400 according to embodiments of the invention. The shale sorbents 230 produced by a gasifier 200 may be tailored such that the amount of char or activated carbon in the shale sorbents 230 is at a desired level for the particular clinkering process to which the shale sorbent 230 is being added. In addition, the size of the shale sorbent 230 particles added to a cement kiln 400 may be tailored to the desired reactions in the cement kiln 400. For example, shale sorbent 230 from a gasifier 200 or other thermal conversion process or from a storage facility may be ground or otherwise processed to produce shale sorbent 230 having a desired particle size for a particular clinkering process.

The introduction of shale sorbent 230 into the cement kiln 400 may also provide an additional source of material for forming cement clinker 450. The use of oil shale as a cement clinker 450 production component has been conventionally used. As with the clinkering of oil shale, the clinkering of shale sorbent 230 may provide a cement clinker 450 that is desirable. The size of the shale sorbent 230 used to produce cement clinker 450 may be controlled, such as by feeding the shale sorbent 230 formed in gasifier 200 to a grinder/classifier 290 prior to introduction of the shale sorbent 230 into a cement kiln 400, as illustrated in FIG. 4.

In still other particular embodiments of the invention, the shale sorbent 230 produced in a gasifier 200 or other thermal conversion process may be used to scrub or otherwise remove pollutants from effluent gases 460 from a cement kiln 400. For example, as illustrated in FIG. 4, shale sorbent 230 produced by gasifier 200 or other thermal conversion process may be fed to a reactor 470 where effluent gases 460 from a cement kiln 400 may be cleaned of pollutants. The reactor 470 may include a fixed or transport reactor sorbent bed wherein shale sorbent 230 is used to remove pollutants such as mercury-containing pollutants, sulfur-containing pollutants, nitrogen-containing pollutants, and hydrochloric acid.

As illustrated in FIG. 4, effluent gases 460 from a cement kiln 400 may be fed to the reactor 470 along with shale sorbent 230 from a gasifier 200 or other thermal conversion process or other source. Pollutants in the effluent gases 460 may react with the shale sorbent 230 according to Reactions described herein. For example, sulfur-containing pollutants may react with the shale sorbent 230 in accordance with Reactions 9-15; mercury-containing pollutants may react with the shale sorbent 230 in accordance with Reactions 7-10; and hydrochloric acid ("HCl") may react with shale sorbent 230 in accordance with Reactions 22-23.

Spent shale sorbent 230 which may have absorbed or adsorbed its limits of pollutants maybe removed 232, 465 from the reactor 470 and stored or otherwise disposed of according to conventional methods.

Although embodiments of the invention have been described with respect to the use of a shale sorbent 230 and pyrolysis gas 220 from a gasifier 200 or other thermal conversion process as illustrated in FIG. 4, it is also understood that the shale sorbent 230 or pyrolysis gas 220 used with the cement kiln 400 may be obtained from other sources. For example, pyrolysis gas 220 from a gasifier 200 or other thermal conversion process may be stored or otherwise processed offsite and delivered to a cement kiln 400 such as by pipeline or tanker truck. Similarly, shale sorbent 230 produced by a gasifier 200 or other thermal conversion process may be stored and later transported to a cement kiln 400 for use with a clinkering process or as a pollutant control for scrubbing effluent gases 460.

Shale sorbent 230 added to a cement kiln 400 may also contribute energy to produce heat (or enthalpy) to the cement kiln 400 system. For example, the addition of shale sorbent 230 to a cement kiln 400 may contribute some enthalpy to the cement kiln 400 in a manner similar to the addition of oil shale to increase enthalpy of a system in accordance with Reactions 24-31.

Figure 5:
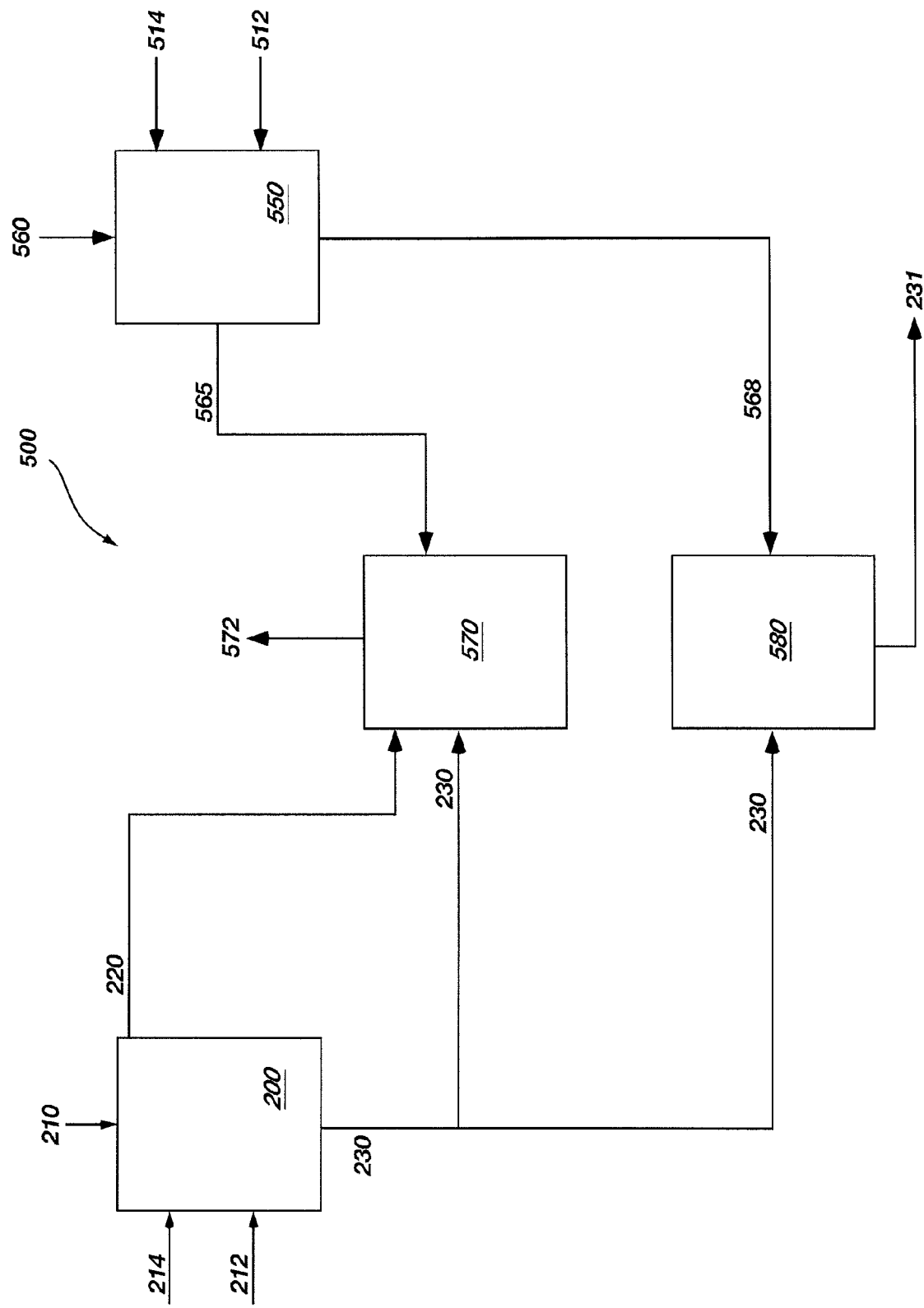
FIG. 5 is a schematic illustration of a gasifier and a syngas and/or synfuels production process according to embodiments of the invention.

According to still other embodiments of the invention, the shale sorbent 230 and pyrolysis gas 220 products of a gasifier 200 or other thermal conversion process may be used in the production of synthesis gas, or syngas, and synthesis fuels, or synfuels. As illustrated in FIG. 5, a gasifier 200 or other thermal conversion process according to embodiments of the invention may be combined with a syngas or synfuels production process 500.

In a syngas production process, a feedstock 560 such as coal, municipal waste, waste tires, biomass, or other synthesis gas feedstock, may be fed to a syngas gasifier 550 where the feedstock 560 is burned to form carbon monoxide ("CO") and hydrogen ("$H_2$"), or a syngas 565. The carbon monoxide and hydrogen may then be used in a syngas or synfuels production process. Steam 512 and oxidizer air 514 may be fed to the syngas gasifier 550 to promote the combustion of the feedstock 560 in the syngas gasifier 550. Waste products 568 from the syngas gasifier 550 may include pollutants such as mercury-containing pollutants and other metal pollutants.

According to particular embodiments of the invention, the pyrolysis gases 220 from the gasifier 200 or other thermal conversion process may be combined with the syngas 565 in a reactor 570, such as a fixed- or fluidized-bed reactor. The combination of the pyrolysis gases 220 with the syngas 565 may form a product gas 572 which may be used in the further processing of syngas and synfuels. For example, the product gas 572 may include components such as carbon monoxide, carbon dioxide, hydrogen, light hydrocarbons, and heavy hydrocarbons. The product gas 572 may be processed according to conventional methods to form syngas and synfuels.

Shale sorbent 230 from the gasifier 200 or other thermal conversion process may also be fed to the reactor 570. The shale sorbent 230 in the reactor 570 may be used to absorb or adsorb pollutants from the pyrolysis gas 220 and syngas 565 which is combined in the reactor 570.

Shale sorbent 230 from the gasifier 200 or other thermal conversion process may also be fed to a transport reactor 580, such as a fixed- or fluidized-bed reactor. Waste products 568 from the syngas gasifier 550 may also be fed to the transport reactor 580. The combination of the waste products 568 with the shale sorbent 230 in the transport reactor 580 may allow the shale sorbent 230 to absorb or adsorb pollutants from the waste products 568. For example, the shale sorbent 230 fed to the transport reactor 580 may adsorb or absorb pollutants such as sulfur-containing pollutants, halide compounds, mercury-containing pollutants, or other pollutants from the waste products 568. The spent shale sorbent 231 may be reclaimed for construction material or may be discarded in landfills according to conventional processes. In some instances, the pozzolanic nature of the spent shale 231 will help immobilize the pollutants and contaminants absorbed or adsorbed by the shale sorbent 230 when stored in a landfill.

Although the transport reactor 580 illustrated in FIG. 5 is a single reactor, a series of transport reactors may be used. In some instances, the temperatures of a series of transport reactors may be controlled such that different pollutants are adsorbed or absorbed by the shale sorbent 230 fed to each of the transport reactors.

According to still other embodiments of the invention, shale sorbent 230 and pyrolysis gases 220 from a gasifier 200 or other thermal conversion process may be used in metallurgical processes. For example, in a metallurgical process such as an ore smelting or refining process, large amounts of energy are used to provide heat to the process. The process also creates pollutants which must be captured or otherwise reduced from the waste products before being disposed. The combination of a gasifier 200 or other thermal conversion process according to embodiments of the invention with a metallurgical process may provide a heating gas, a pollutant reduction gas, and a sorbent for adsorbing or absorbing pollutants from the waste products produced by the process.

In a metallurgical process, pyrolysis gases 220 from a gasifier 200 or other thermal conversion process may be used as heating gases or fuel to help provide the heat that is necessary for the metallurgical process. The pyrolysis gases 220 may also be burned or subject to oxidation to reduce pollutants such as $NO_x$ pollutants in the process. The shale sorbent 230 created by the gasifier 200 may be combined with the process or with the waste products from the process to remove pollutants from the waste products. For example, the shale sorbent 230 may be used to remove sulfur-containing pollutants, mercury-containing pollutants, halide compounds, metal pollutants, or other pollutants from the waste products.

Embodiments of the invention, therefore, may be used or combined with many different processes to provide additional heating gases, pollutant reduction gases, or pollution sorbents for the processes. Although embodiments of the invention have been described with respect to particular processes, it is understood that the embodiments of the invention, and the pyrolysis gases 220 and shale sorbents 230 of the invention, may be combined with other processes, and particularly other processes where additional heating supplies are desired or where additional pollutant control mechanisms are desired.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for decreasing pollutants produced in a thermal conversion process, comprising:
   producing at least one pollutant selected from the group consisting of a chlorine-containing pollutant, a fluorine-containing pollutant, an iodine-containing pollutant, a phosphorous-containing pollutant, a bromine-containing pollutant, and a mercury-containing pollutant in a thermal conversion process;
   introducing oil shale to the thermal conversion process to produce a plurality of shale sorbent particles and kerogen; and
   contacting the at least one pollutant with at least one of the plurality of shale sorbent particles.

2. The method of claim 1, wherein producing at least one pollutant selected from the group consisting of a chlorine-containing pollutant, a fluorine-containing pollutant, an iodine-containing pollutant, a phosphorous-containing pollutant, a bromine-containing pollutant, and a mercury-containing pollutant comprises producing at least one of elemental mercury and mercuric chloride.

3. The method of claim 1, wherein producing at least one pollutant selected from the group consisting of a chlorine-containing pollutant, a fluorine-containing pollutant, an iodine-containing pollutant, a phosphorous-containing pollutant, a bromine-containing pollutant, and a mercury-containing pollutant in a thermal conversion process comprises producing the at least one pollutant in a thermal conversion process selected from the group consisting of a coal boiler process, a pulverized coal combustor process, a cement kiln process, an ore refining process, a metals refining process, a calcination process, and a metal pyrolysis process.

4. The method of claim 1, wherein producing pollutant selected from the group consisting of a chlorine-containing pollutant, a fluorine-containing pollutant, an iodine-containing pollutant, a phosphorous-containing pollutant, a bromine-containing pollutant, and a mercury-containing pollutant in a thermal conversion process comprises producing the at least one pollutant in a thermal conversion process producing heat from a device selected from the group consisting of a furnace, a combustion chamber, a pulverized coal combustion chamber, a fluidized bed combustion chamber, a circulating bed combustion chamber, a staged reactor combustion chamber, an entrained-flow combustion chamber, a boiler, a reactor, a retort, a pyrolizer, a gasifier, a calcination device, an ore refining process, a metals refining process, an offgas duct, an offgas cleanup transport reactor, and a cement kiln.

5. The method of claim 1, wherein contacting the at least one pollutant with at least one of the plurality of shale sorbent particles comprises contacting at least one of mercury and mercuric chloride with the at least one of the plurality of shale sorbent particles at a temperature of less than or equal to about 200° C.

6. The method of claim 1, wherein introducing oil shale to the thermal conversion process to produce a plurality of shale sorbent particles and kerogen comprises devolatilizing kerogen from the oil shale to form a plurality of shale sorbent particles comprising a porous matrix.

7. The method of claim 1, wherein introducing oil shale to the thermal conversion process comprises introducing a plurality of oil shale particles having particle sizes ranging from about 50 μm to about 150 μm into a product stream of the thermal conversion process.

8. The method of claim 1, wherein contacting the at least one pollutant with at least one of the plurality of shale sorbent particles comprises adsorbing the at least one pollutant with the at least one of the plurality of shale sorbent particles.

9. The method of claim 1, further comprising producing a nitrogen-containing pollutant in the thermal conversion process.

10. The method of claim 9, further comprising exposing the nitrogen-containing pollutant to the kerogen.

11. The method of claim 1, wherein contacting the at least one pollutant with the at least one of the plurality of shale sorbent particles comprises contacting hydrochloric acid with the at least one of the plurality of shale sorbent particles at a temperature of from about 500° C. to less than about 1150° C.

12. A method of producing a pollutant control substance, comprising exposing oil shale to a thermal source to produce kerogen and a shale sorbent formulated to absorb or adsorb at least one pollutant selected from the group consisting of a chlorine-containing pollutant, a fluorine-containing pollutant, an iodine-containing pollutant, a phosphorous-containing pollutant, a bromine-containing pollutant, and a mercury-containing pollutant.

13. The method of claim 12, wherein exposing oil shale to a thermal source comprises exposing the oil shale to at least one process selected from the group consisting of heating the oil shale, pyrolyzing the oil shale, devolatilizing the oil shale, calcining the oil shale, reforming the oil shale, gasifying the oil shale, retorting the oil shale, coking the oil shale, and combusting the oil shale.

14. The method of claim 12, further comprising diverting at least a portion of the shale sorbent to at least one process selected from the group consisting of a storage process, a gas/oil combustion process, a cement kiln combustion process, a calcination process, an ore refining process, a metals refining process, a coal combustion process, a Fischer-Tropsch process, and a fuel refinement process.

15. The method of claim 12, further comprising processing the kerogen to produce a reductant for reducing nitrogen-containing pollutant.

16. The method of claim 12, further comprising heating the kerogen to a temperature of greater than or equal to about 350° C. to produce hydrocarbons from the kerogen.

17. The method of claim 12, further comprising diverting at least a portion of the kerogen to at least one process selected from the group consisting of a storage process, a gas/oil combustion process, a cement kiln combustion process, a coal combustion process, a calcination process, an ore refining process, a metals refining process, a Fischer-Tropsch process, and a fuel refinement process.

18. The method of claim 12, further comprising calcining the shale sorbent at a temperature of greater than or equal to about 450° C.

19. A combustion apparatus, comprising:
 a thermal conversion zone configured to combust a combustible material and produce at least one pollutant selected from the group consisting of nitrogen-containing pollutants, chlorine, hydroiodic acid, iodine, hydrofluoric acid, fluorine, hydrobromic acid, bromous acid, bromine, phosphoric acid, phosphorous pentaoxide, phosphine, phosphonium compounds, elemental mercury, and mercuric chloride;
 at least one feed zone configured to devolatilize kerogen from oil shale to produce a shale sorbent and kerogen;
 a pollutant contact zone configured to receive the kerogen from the at least one feed zone and to facilitate contact between the kerogen and the nitrogen-containing pollutants; and
 at least another pollutant contact zone configured to receive the shale sorbent from the at least one feed zone and to facilitate contact between the shale sorbent and the at least one pollutant.

20. The combustion apparatus of claim 19, wherein the pollutant contact zone is further configured to introduce the shale sorbent to the at least one of the mercury and the mercuric chloride at a temperature of less than or equal to about 200° C.

21. The combustion apparatus of claim 19, wherein the pollutant contact zone is further configured to heat the kerogen as to a temperature of greater than or equal to about 350° C. to produce hydrocarbons.

22. The combustion apparatus of claim 19, wherein the pollutant contact zone is adapted to accept and facilitate contact of at least one of the shale sorbent and the reductant with the at least one pollutant at a temperature ranging from about 450° C. to less than about 1150° C.

23. The combustion apparatus of claim 19, wherein the thermal conversion zone is operable at a temperature of between about 450° C. and about 1150° C.

24. The combustion apparatus of claim 19, wherein the combustion apparatus comprises at least one component selected from the group consisting of a cement kiln combustion chamber, a calcination reactor, a coal combustion chamber, a pulverized coal combustion chamber, a gas combustion chamber, a furnace, a boiler, a gasifier, a fluidized bed combustion chamber, a circulating bed combustion chamber, a staged reactor combustion chamber, an entrained-flow combustion chamber, a fixed-bed reactor, a fluidized-bed reactor, a transport-bed reactor, a steam reformer reactor, a rotary-bed reactor, an offgas duct, and an offgas cleanup transport reactor.

* * * * *

UNITED STATES PATENT AND TRADEMARK OFFICE
CERTIFICATE OF CORRECTION

PATENT NO. : 7,708,964 B2
APPLICATION NO. : 11/460547
DATED : May 4, 2010
INVENTOR(S) : Richard D. Boardman and Robert A. Carrington It is certified that error appears in the above-identified patent and that said Letters Patent is hereby corrected as shown below:

| | | |
|---|---|---|
| COLUMN 7, | LINES 36,37 | change "hydrobromic ("HBr")," to --hydrobromic acid ("HBr"),-- |
| COLUMN 8, | LINE 4, | delete "surrounding gas temperature," |
| COLUMN 9, | LINE 56, | change "$M_x\text{-}(CO_3)_y + \text{heat} \rightarrow M_x\text{-}O_y y CO_2$" to --$M_x\text{-}(CO_3)_y + \text{heat} \rightarrow M_x\text{-}O_y + y CO_2$-- |
| COLUMN 9, | LINE 65, | change "$CaO + SO_2 + \frac{1}{2} CaSO_4$" to --$CaO + SO_2 + \frac{1}{2} O_2 \rightarrow CaSO_4$-- |
| COLUMN 13, | LINE 12, | change "Reactions 9-17." to --Reactions 11-19.-- |
| COLUMN 13, | LINE 38, | change "Reactions 5-8." to --Reactions 7-10.-- |
| COLUMN 20, | LINE 42, | change "presence of NOR," to --presence of $NO_x$,-- |
| COLUMN 20, | LINE 53, | change "$C_xH_y + (x+y4)O_2 \rightarrow xCO_2 + y/2\ H_2O$" to --$C_xH_y + (x+y/4)O_2 \rightarrow xCO_2 + y/2\ H_2O$-- |
| COLUMN 21, | LINE 57, | change "Reactions 5 through 8" to --Reactions 7 through 10-- |
| COLUMN 25, | LINE 49, | change "Reactions 9-15;" to --Reactions 11-19;-- |
| COLUMN 25, | LINE 54, | change "maybe removed" to --may be removed-- |

Signed and Sealed this
First Day of November, 2011

David J. Kappos
*Director of the United States Patent and Trademark Office*